(12) United States Patent
Mehta et al.

(10) Patent No.: US 10,447,865 B2
(45) Date of Patent: Oct. 15, 2019

(54) SYSTEMS AND METHODS FOR EMERGENCY COMMUNICATIONS

(71) Applicant: RapidSOS, Inc., New York, NY (US)

(72) Inventors: Anil Mehta, Makanda, IL (US); Michael John Martin, Long Island City, NY (US); Nicholas Edward Horelik, Long Island City, NY (US); Reinhard Ekl, New York, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 15/880,208

(22) Filed: Jan. 25, 2018

(65) Prior Publication Data

US 2018/0152563 A1 May 31, 2018

Related U.S. Application Data

(63) Continuation of application No. 15/497,067, filed on Apr. 25, 2017, now Pat. No. 9,924,043.
(Continued)

(51) Int. Cl.
*H04M 11/04* (2006.01)
*H04M 3/42* (2006.01)
*H04M 3/51* (2006.01)
*H04W 80/04* (2009.01)
*H04W 4/90* (2018.01)
*H04L 12/66* (2006.01)
(Continued)

(52) U.S. Cl.
CPC ....... *H04M 11/04* (2013.01); *H04M 3/42042* (2013.01); *H04M 3/5116* (2013.01); *H04W 4/90* (2018.02); *H04W 80/04* (2013.01); *H04L 12/66* (2013.01); *H04L 67/18* (2013.01); *H04M 7/006* (2013.01); *H04W 76/50* (2018.02)

(58) Field of Classification Search
CPC ..... H04L 12/66; H04M 11/04; H04W 76/007; H04W 4/12; H04W 4/22; H04W 4/14; H04W 4/02; H04W 4/21; G08B 25/08; G08B 25/016; G08B 21/02; G08B 27/006
USPC ........ 379/37, 39, 40, 41, 42, 45, 46, 47, 49, 379/51; 455/404.1, 450, 464, 509
See application file for complete search history.

(56) References Cited

U.S. PATENT DOCUMENTS

| 5,379,337 A | 1/1995 | Castillo et al. |
| 5,479,482 A | 12/1995 | Grimes |

(Continued)

FOREIGN PATENT DOCUMENTS

| CA | 2662606 A1 | 10/2009 |
| CA | 2697986 A1 | 9/2010 |

(Continued)

OTHER PUBLICATIONS

ArcGIS REST Services Directory. Folder: TIGERWeb. Available at https://tigerweb.geo.census.gov/arcgis/rest/services/TIGERweb. (1 pg.) (Accessed Sep. 2017).
(Continued)

*Primary Examiner* — Binh Kien Tieu
(74) *Attorney, Agent, or Firm* — Wilson Sonsini Goodrich & Rosati

(57) ABSTRACT

Described herein are methods, devices, media, and systems for managing emergency communications and providing seamless data extraction from a communication device by an emergency service.

20 Claims, 7 Drawing Sheets

Related U.S. Application Data

(60) Provisional application No. 62/327,499, filed on Apr. 26, 2016.

(51) Int. Cl.
*H04L 29/08* (2006.01)
*H04M 7/00* (2006.01)
*H04W 76/50* (2018.01)

(56) References Cited

U.S. PATENT DOCUMENTS

| | | |
|---|---|---|
| 5,563,931 A | 10/1996 | Bishop et al. |
| 5,596,625 A | 1/1997 | Leblanc |
| 5,710,803 A | 1/1998 | Kowal et al. |
| 5,742,666 A | 4/1998 | Alpert |
| 6,014,555 A | 1/2000 | Tendler |
| 6,133,853 A | 10/2000 | Obradovich et al. |
| 6,249,674 B1 | 6/2001 | Verdonk |
| 6,252,943 B1 | 6/2001 | Johnson et al. |
| 6,256,489 B1 | 7/2001 | Lichter et al. |
| 6,363,138 B1 | 3/2002 | Aprile et al. |
| 6,459,782 B1 | 10/2002 | Bedrosian et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,574,323 B1 | 6/2003 | Manuel et al. |
| 6,587,545 B1 | 7/2003 | Antonucci et al. |
| 6,594,666 B1 | 7/2003 | Biswas et al. |
| 6,600,812 B1 | 7/2003 | Gentillin et al. |
| 6,628,933 B1 | 9/2003 | Humes |
| 6,680,998 B1 | 1/2004 | Bell et al. |
| 6,707,421 B1 | 3/2004 | Drury et al. |
| 6,731,610 B2 | 5/2004 | Sajikawa et al. |
| 6,993,118 B2 | 1/2006 | Antonucci et al. |
| 7,054,611 B2 | 5/2006 | Eisner et al. |
| 7,058,385 B2 | 6/2006 | Lauper |
| 7,177,400 B2 | 2/2007 | Eisner et al. |
| 7,224,773 B2 | 5/2007 | Croak et al. |
| 7,271,704 B2 | 9/2007 | McSheffrey et al. |
| 7,324,801 B2 | 1/2008 | Droste et al. |
| 7,349,706 B2 | 3/2008 | Kim et al. |
| 7,409,044 B2 | 8/2008 | Leduc |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,937,067 B2 | 5/2011 | Maier et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager et al. |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,401,565 B2 | 3/2013 | Sandberg et al. |
| 8,417,090 B2 | 4/2013 | Fleming et al. |
| 8,417,212 B2 | 4/2013 | Cepuran et al. |
| 8,442,481 B2 | 5/2013 | Maier et al. |
| 8,442,482 B2 | 5/2013 | Maier et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,649,806 B2 | 2/2014 | Cuff et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,755,767 B2 | 6/2014 | Maier et al. |
| 8,760,290 B2 | 6/2014 | Piett et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,918,075 B2 | 12/2014 | Maier et al. |
| 8,948,732 B1 | 2/2015 | Negahban et al. |
| 8,971,839 B2 | 3/2015 | Hong |
| 8,984,143 B2 | 3/2015 | Serra et al. |
| 9,008,078 B2 | 4/2015 | Kamdar et al. |
| 9,014,657 B2 | 4/2015 | Rohde et al. |
| 9,019,870 B2 | 4/2015 | Khan et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,129,219 B1 | 9/2015 | Robertson et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,384,491 B1 | 7/2016 | Briggs et al. |
| 9,402,159 B1 | 7/2016 | Self et al. |
| 9,408,051 B2 | 8/2016 | Finney et al. |
| 9,420,099 B1 | 8/2016 | Krishnan et al. |
| 9,426,638 B1 | 8/2016 | Johnson |
| 9,503,876 B2 | 11/2016 | Saito et al. |
| 9,544,750 B1 | 1/2017 | Self et al. |
| 9,591,467 B2 | 3/2017 | Piett et al. |
| 9,635,534 B2 | 4/2017 | Maier et al. |
| 9,659,484 B1 | 5/2017 | Mehta et al. |
| 9,693,213 B2 | 6/2017 | Self et al. |
| 9,734,721 B2* | 8/2017 | Stenneth ............ G06F 11/0793 |
| 9,736,670 B2 | 8/2017 | Mehta et al. |
| 9,756,169 B2 | 9/2017 | Mehta et al. |
| 9,805,430 B2 | 10/2017 | Miasnik et al. |
| 9,838,858 B2 | 12/2017 | Anand et al. |
| 10,089,854 B2 | 10/2018 | Hender et al. |
| 10,142,213 B1 | 11/2018 | Hart et al. |
| 2001/0051849 A1 | 12/2001 | Boone |
| 2002/0001367 A1 | 1/2002 | Lee |
| 2002/0027975 A1* | 3/2002 | Oxley ............... H04M 3/42 379/45 |
| 2002/0057678 A1 | 5/2002 | Jiang et al. |
| 2002/0120698 A1 | 8/2002 | Tamargo |

(56) References Cited

U.S. PATENT DOCUMENTS

| | | |
|---|---|---|
| 2003/0069035 A1 | 4/2003 | Shurvinton |
| 2003/0109245 A1* | 6/2003 | McCalmont ............ H04L 12/66 379/45 |
| 2004/0203572 A1 | 10/2004 | Aerrabotu et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0151642 A1 | 7/2005 | Tupler et al. |
| 2005/0222829 A1 | 10/2005 | Dumas |
| 2005/0282518 A1 | 12/2005 | D'Evelyn et al. |
| 2006/0109960 A1* | 5/2006 | D'Evelyn ............... H04W 4/90 379/37 |
| 2006/0293024 A1 | 12/2006 | Benco et al. |
| 2007/0030146 A1 | 2/2007 | Shepherd |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1 | 3/2007 | Massa et al. |
| 2007/0060097 A1 | 3/2007 | Edge et al. |
| 2007/0161383 A1 | 7/2007 | Caci |
| 2007/0164872 A1 | 7/2007 | Monroe |
| 2007/0218895 A1 | 9/2007 | Saito et al. |
| 2008/0019268 A1 | 1/2008 | Rollins |
| 2008/0063153 A1 | 3/2008 | Krivorot et al. |
| 2008/0077474 A1 | 3/2008 | Dumas et al. |
| 2008/0081646 A1 | 4/2008 | Morin et al. |
| 2008/0166990 A1 | 7/2008 | Toiv |
| 2008/0194238 A1 | 8/2008 | Kwon |
| 2008/0253535 A1* | 10/2008 | Sherry ................. H04M 3/5116 379/45 |
| 2008/0294058 A1 | 11/2008 | Shklarski |
| 2009/0186596 A1 | 7/2009 | Kaltsukis et al. |
| 2009/0257345 A1 | 10/2009 | King |
| 2009/0322513 A1 | 12/2009 | Hwang et al. |
| 2010/0002846 A1 | 1/2010 | Ray et al. |
| 2010/0003964 A1* | 1/2010 | Khare ..................... G06F 21/35 455/410 |
| 2010/0156626 A1 | 6/2010 | Story |
| 2010/0159871 A1 | 6/2010 | Tester |
| 2010/0159976 A1 | 6/2010 | Marocchi et al. |
| 2010/0166153 A1 | 7/2010 | Guleria et al. |
| 2010/0202368 A1 | 8/2010 | Hans |
| 2010/0238018 A1 | 9/2010 | Kelly |
| 2010/0262668 A1* | 10/2010 | Piett ....................... H04W 4/90 709/206 |
| 2011/0009086 A1 | 1/2011 | Poremba et al. |
| 2011/0029600 A1 | 2/2011 | Theimer |
| 2011/0071880 A1 | 3/2011 | Spector |
| 2011/0086607 A1 | 4/2011 | Wang et al. |
| 2011/0103266 A1 | 5/2011 | Andreasen et al. |
| 2011/0134897 A1 | 6/2011 | Montemurro et al. |
| 2011/0153368 A1 | 6/2011 | Pierre et al. |
| 2011/0201357 A1 | 8/2011 | Garrett et al. |
| 2011/0263219 A1 | 10/2011 | Hasenfang et al. |
| 2011/0263319 A1 | 10/2011 | Haemaelaeinen et al. |
| 2012/0002792 A1 | 1/2012 | Chang |
| 2012/0028599 A1 | 2/2012 | Hatton et al. |
| 2012/0029970 A1 | 2/2012 | Stiles et al. |
| 2012/0092161 A1 | 4/2012 | West |
| 2012/0144019 A1 | 6/2012 | Zhu et al. |
| 2012/0157795 A1 | 6/2012 | Chiu et al. |
| 2012/0202428 A1 | 8/2012 | Mirbaha et al. |
| 2012/0210325 A1 | 8/2012 | De Lind Van Wijngaarden et al. |
| 2012/0218102 A1 | 8/2012 | Bivens et al. |
| 2012/0257729 A1 | 10/2012 | Piett et al. |
| 2012/0258680 A1* | 10/2012 | Piett ....................... H04W 4/90 455/404.1 |
| 2012/0289243 A1 | 11/2012 | Tarlow et al. |
| 2012/0295575 A1 | 11/2012 | Nam |
| 2012/0309341 A1 | 12/2012 | Ward |
| 2013/0005295 A1 | 1/2013 | Park et al. |
| 2013/0030825 A1 | 1/2013 | Bagwandeen et al. |
| 2013/0084824 A1 | 4/2013 | Hursey |
| 2013/0102351 A1 | 4/2013 | Mo |
| 2013/0122932 A1 | 5/2013 | Patel et al. |
| 2013/0138791 A1 | 5/2013 | Thomas et al. |
| 2013/0183924 A1 | 7/2013 | Saigh et al. |
| 2013/0185368 A1 | 7/2013 | Nordstrom et al. |
| 2013/0203373 A1 | 8/2013 | Edge |
| 2013/0203376 A1 | 8/2013 | Maier et al. |
| 2013/0226369 A1 | 8/2013 | Yorio et al. |
| 2013/0237175 A1 | 9/2013 | Piett |
| 2013/0237181 A1 | 9/2013 | Ray |
| 2013/0331055 A1 | 12/2013 | McKown et al. |
| 2014/0051379 A1 | 2/2014 | Ganesh et al. |
| 2014/0086108 A1 | 3/2014 | Dunn et al. |
| 2014/0087680 A1 | 3/2014 | Luukkala et al. |
| 2014/0113606 A1 | 4/2014 | Morken et al. |
| 2014/0126356 A1 | 5/2014 | Lee et al. |
| 2014/0148120 A1 | 5/2014 | Buck |
| 2014/0155018 A1 | 6/2014 | Fan et al. |
| 2014/0164505 A1 | 6/2014 | Daly et al. |
| 2014/0199959 A1 | 7/2014 | Hassan et al. |
| 2014/0213212 A1 | 7/2014 | Clawson |
| 2014/0248848 A1 | 9/2014 | Mufti et al. |
| 2014/0257846 A1 | 9/2014 | Hermiz et al. |
| 2014/0302810 A1* | 10/2014 | Inha ....................... H04W 4/70 455/404.1 |
| 2014/0324351 A1 | 10/2014 | Dannevik et al. |
| 2014/0368601 A1 | 12/2014 | Decharms |
| 2015/0029836 A1 | 1/2015 | Hans et al. |
| 2015/0055453 A1 | 2/2015 | Chaki et al. |
| 2015/0081209 A1 | 3/2015 | Yeh et al. |
| 2015/0094095 A1 | 4/2015 | Johnson et al. |
| 2015/0099481 A1 | 4/2015 | Maitre et al. |
| 2015/0109125 A1 | 4/2015 | Kaib et al. |
| 2015/0111524 A1 | 4/2015 | South et al. |
| 2015/0137972 A1 | 5/2015 | Nepo et al. |
| 2015/0172897 A1 | 6/2015 | Mariathasan et al. |
| 2015/0181401 A1 | 6/2015 | Dhandu et al. |
| 2015/0289121 A1 | 10/2015 | Lesage et al. |
| 2015/0304827 A1 | 10/2015 | Price et al. |
| 2015/0317392 A1 | 11/2015 | Fernandez |
| 2015/0350262 A1 | 12/2015 | Rainisto et al. |
| 2015/0358794 A1 | 12/2015 | Nokhoudian et al. |
| 2015/0365319 A1 | 12/2015 | Finn et al. |
| 2016/0004224 A1 | 1/2016 | Pi |
| 2016/0026768 A1 | 1/2016 | Singh et al. |
| 2016/0057595 A1* | 2/2016 | Ahmed ................... H04W 4/02 455/404.1 |
| 2016/0088455 A1 | 3/2016 | Bozik et al. |
| 2016/0210581 A1 | 7/2016 | Braun |
| 2016/0219084 A1 | 7/2016 | Abiezzi |
| 2016/0219397 A1 | 7/2016 | Mayor et al. |
| 2016/0227589 A1* | 8/2016 | Marshall ................ H04W 4/02 |
| 2016/0269535 A1 | 9/2016 | Balabhadruni et al. |
| 2016/0307436 A1 | 10/2016 | Nixon |
| 2016/0315923 A1 | 10/2016 | Riscombe-Burton et al. |
| 2016/0330769 A1 | 11/2016 | Edge |
| 2016/0337831 A1 | 11/2016 | Piett et al. |
| 2016/0345171 A1 | 11/2016 | Kulkarni et al. |
| 2016/0353266 A1 | 12/2016 | Winkler et al. |
| 2016/0363931 A1 | 12/2016 | Yang et al. |
| 2016/0371973 A1 | 12/2016 | Holleczek et al. |
| 2017/0004427 A1 | 1/2017 | Bruchal et al. |
| 2017/0046216 A1* | 2/2017 | Stenneth ............ G06F 11/0793 |
| 2017/0099579 A1 | 4/2017 | Ryan et al. |
| 2017/0140637 A1 | 5/2017 | Thurlow et al. |
| 2017/0142568 A1 | 5/2017 | Saito et al. |
| 2017/0150335 A1 | 5/2017 | Self et al. |
| 2017/0161614 A1 | 6/2017 | Mehta et al. |
| 2017/0164175 A1 | 6/2017 | Bozik et al. |
| 2017/0171735 A1 | 6/2017 | Anand et al. |
| 2017/0180486 A1 | 6/2017 | Mehta et al. |
| 2017/0180963 A1 | 6/2017 | Cavendish et al. |
| 2017/0180966 A1 | 6/2017 | Piett et al. |
| 2017/0213251 A1 | 7/2017 | Nunally et al. |
| 2017/0238129 A1 | 8/2017 | Maier et al. |
| 2017/0238136 A1 | 8/2017 | Smith |
| 2017/0245113 A1 | 8/2017 | Hooker |
| 2017/0245130 A1 | 8/2017 | Mehta et al. |
| 2017/0251347 A1 | 8/2017 | Mehta et al. |
| 2017/0310827 A1 | 10/2017 | Mehta et al. |

(56) References Cited

U.S. PATENT DOCUMENTS

| | | | |
|---|---|---|---|
| 2017/0316698 A1* | 11/2017 | Stenneth | G06F 11/0793 |
| 2017/0325056 A1 | 11/2017 | Mehta et al. | |
| 2017/0330447 A1 | 11/2017 | Mehta et al. | |
| 2018/0020091 A1 | 1/2018 | Self et al. | |
| 2018/0039737 A1 | 2/2018 | Dempers et al. | |
| 2018/0077282 A1 | 3/2018 | Herron et al. | |
| 2018/0242133 A1 | 8/2018 | Anand et al. | |
| 2018/0249315 A1 | 8/2018 | Mehta et al. | |
| 2018/0262544 A1 | 9/2018 | Mehta et al. | |
| 2018/0310159 A1 | 10/2018 | Katz et al. | |
| 2019/0020993 A1 | 1/2019 | Nguyen | |
| 2019/0166480 A1 | 5/2019 | Rauner | |

FOREIGN PATENT DOCUMENTS

| | | |
|---|---|---|
| CA | 2773749 A1 | 10/2012 |
| CA | 2773881 A1 | 10/2012 |
| CA | 2790501 A1 | 3/2013 |
| CA | 2809421 A1 | 9/2013 |
| CA | 2646607 C | 9/2016 |
| CA | 2886535 A1 | 10/2016 |
| CN | 106021508 A | 10/2016 |
| JP | 2012222443 A | 11/2012 |
| KR | 20090019606 A | 2/2009 |
| KR | 20090092900 A | 9/2009 |
| KR | 20100055746 A | 5/2010 |
| KR | 101305286 B1 | 9/2013 |
| KR | 20140052780 A | 5/2014 |
| KR | 20140093568 A | 7/2014 |
| KR | 20150097031 A | 8/2015 |
| KR | 101602482 B1 | 3/2016 |
| KR | 101612423 B1 | 4/2016 |
| KR | 20160097933 A | 8/2016 |
| WO | WO-0022593 A1 | 4/2000 |
| WO | WO-0167419 A2 | 9/2001 |
| WO | WO-2007109599 A2 | 12/2007 |
| WO | WO-2012129561 A1 | 9/2012 |
| WO | WO-2014025563 A1 | 2/2014 |
| WO | WO-2014063121 A1 | 4/2014 |
| WO | WO-2014074420 A1 | 5/2014 |
| WO | WO-2014176646 A1 | 11/2014 |
| WO | WO-2015127867 A1 | 9/2015 |
| WO | WO-2015196155 A1 | 12/2015 |
| WO | WO-2016044540 A1 | 3/2016 |
| WO | WO-2017079354 A1 | 5/2017 |
| WO | WO-2017100220 A1 | 6/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |
| WO | WO-2018039142 A1 | 3/2018 |
| WO | WO-2019113129 A1 | 6/2019 |

OTHER PUBLICATIONS

Co-pending U.S. Appl. No. 15/682,440, filed Aug. 21, 2017.
PCT/US2015/050609 International Preliminary Report on Patentability dated Mar. 30, 2017.
PCT/US2015/050609 International Search Report and Written Opinion dated Dec. 16, 2015.
PCT/US2016/060189 International Search Report and Written Opinion dated Feb. 24, 2017.
PCT/US2016/065212 International Search Report and Written Opinion dated Feb. 20, 2017.
PCT/US2016/067366 International Search Report and Written Opinion dated Mar. 31, 2017.
PCT/US2016/068134 International Search Report and Written Opinion dated Apr. 21, 2017.
PCT/US2017/029465 International Search Report and Written Opinion dated Aug. 9, 2017.
PCT/US2017/031605 International Search Report and Written Opinion dated Jul. 31, 2017.
PCT/US2017/047854 International Search Report and Written Opinion dated Nov. 28, 2017.
Seattle Real Time Fire 911 Calls. Available at https://catalog.data.gov/dataset/seattle-real-time-fire-911-calls-6cdf3 (3 pgs.) (Accessed Sep. 2017).
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Census Bureau. Developers: Population Estimates APIs. Available at https://www.census.gov/data/developers/data-sets/popest-popproj/popest.html (2 pgs.) (Accessed Sep. 2017).
U.S. Appl. No. 14/794,780 Office Action dated Feb. 2, 2016.
U.S. Appl. No. 14/794,780 Office Action dated Mar. 7, 2017.
U.S. Appl. No. 14/794,780 Office Action dated Nov. 15, 2016.
U.S. Appl. No. 14/856,818 Office Action dated Apr. 12, 2017.
U.S. Appl. No. 15/387,363 Office Action dated Jul. 6, 2017.
U.S. Appl. No. 15/387,363 Office Action dated Mar. 15, 2017.
U.S. Appl. No. 15/436,379 Office Action dated Apr. 6, 2017.
U.S. Appl. No. 15/436,379 Office Action dated Nov. 2, 2017.
U.S. Appl. No. 15/436,484 Office Action dated May 8, 2017.
U.S. Appl. No. 15/436,484 Office Action dated Sep. 14, 2017.
U.S. Appl. No. 15/444,133 Office Action dated Apr. 4, 2017.
U.S. Appl. No. 15/444,133 Office Action dated Aug. 17, 2017.
U.S. Appl. No. 15/497,067 Office Action dated Jun. 23, 2017.
U.S. Appl. No. 15/589,847 Office Action dated Jun. 23, 2017.
U.S. Appl. No. 15/589,847 Office Action dated Nov. 30, 2017.
U.S. Appl. No. 15/667,531 Office Action dated Nov. 8, 2017.
Weather Company Data for IBM Bluemix APIs. Available at https://twcservice.mybluemix.net/rest-api/ (100 pgs) (Accessed Sep. 2017).
Abel et al. Semantics + Filtering + Search = Twitcident exploring information in social web streams. HT'12—Proceedings pf 23rd ACM Conference on Hypertext and Social Media (10 pgs) (2012).
Chowdhury et al. Tweet4act: Using incident-specific profiles for classifying crisis-related messages. Proceedings of the 10th International ISCRAM Conference (pp. 834-839) (2013).
Co-pending U.S. Appl. No. 16/162,171 dated Oct. 16, 2016.
Co-pending U.S. Appl. No. 16/209,892, dated Dec. 4, 2018.
Homeland Security Science and Technology. Using Social Media for Enhanced Situational Awareness and Decision Support. Virtual Social Media Working Group and DHS First Responders Group (44 pgs.) (Jun. 2014).
Marcus et al. TwitInfo: Aggregating and Visualizing Microblogs for Event Exploration. ACM CHI Conference 2011 (10 pgs).
Meier. MatchApp: Next Generation Disaster Response App? iRevolution (12 pgs.) (Feb. 27, 2013).
National Emergency Number Association (NENA). Social Networking in 9-1-1 PSAPs Information Document. Available at https://c.ymcdn.com/sites/www.nena.org/resouce/resmgr/Standards/NENA-INF-001.1.1-2012_Social (18 pgs) (2012).
National Emergency Number Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
PCT/US2016/060189 International Preliminary Report on Patentability dated May 17, 2018.
PCT/US2016/065212 International Preliminary Report on Patentability dated Jun. 21, 2018.
PCT/US2016/067366 International Preliminary Report on Patentability dated Jun. 28, 2018.
PCT/US2016/068134 International Preliminary Report on Patentability dated Jul. 5, 2018.
PCT/US2017/029465 International Preliminary Report on Patentability dated Nov. 8, 2018.
PCT/US2018/028951 International Search Report and Written Opinion dated Aug. 10, 2018.
U.S. Appl. No. 15/588,343 Office Action dated Feb. 26, 2018.
U.S. Appl. No. 15/589,847 Office Action dated Nov. 6, 2018.
U.S. Appl. No. 15/667,531 Office Action dated Apr. 5, 2018.

(56) References Cited

OTHER PUBLICATIONS

U.S. Appl. No. 15/958,186 Office Action dated Oct. 18, 2018.
U.S. Appl. No. 15/958,398 Office Action dated Oct. 12, 2018.
U.S. Appl. No. 15/960,384 Office Action dated Jul. 12, 2018.
Co-pending U.S. Appl. No. 16/271,634, filed Feb. 8, 2019.
U.S. Appl. No. 16/209,892 Office Action dated Feb. 8, 2019.
Co-pending U.S. Appl. No. 16/378,363, filed Apr. 8, 2019.
PCT/US2018/063935 International Search Report and Written Opinion dated Mar. 22, 2019.
Co-pending U.S. Appl. No. 16/384,600, filed Apr. 15, 2019.
U.S. Appl. No. 15/682,440 Office Action dated Jul. 10, 2019.
U.S. Appl. No. 16/150,099 Office Action dated Jun. 25, 2019.
U.S. Appl. No. 16/178,476 Office Action dated May 30, 2019.
U.S. Appl. No. 16/271,634 Office Action dated Jun. 13, 2019.
Cipolla et al. A tool for Emergency Detection with Deep Learning Neural Networks. KDWeb (2016) How to predict a disaster. ICAR—National Research Council of Italy—Palermo, Italy (10 pgs).
PCT/US2019/027538 International Search Report and Written Opinion dated Aug. 2, 2019.
U.S. Appl. No. 15/371,117 Office Action dated Aug. 5, 2019.
U.S. Appl. No. 16/378,363 Office Action dated Jul. 19, 2019.
U.S. Appl. No. 16/436,810 Office Action dated Aug. 19, 2019.

* cited by examiner

SYSTEMS AND METHODS FOR EMERGENCY COMMUNICATIONS

CROSS-REFERENCE

This application is a continuation of U.S. patent application Ser. No. 15/497,067, filed Apr. 25, 2017, which claims the benefit of U.S. Provisional Application No. 62/327,499, filed Apr. 26, 2016, all of which are incorporated herein in their entirety by reference.

BACKGROUND

In most countries across the world, designated 3-digit numbers exist to place calls for emergency assistance. These calls for requesting emergency assistance are normally made via analog communication channels such as a public switched telephone network (PSTN) since most emergency service providers such as emergency dispatch centers (EDC) or public-safety access points (PSAP) are generally suited to only receive analog landline based calls. However, a vast number of calls requesting emergency assistance now originate from mobile communication devices such as, for example, mobile phones that are capable of communicating via data communication channels (e.g., Internet Protocol (IP)-based communication sessions). Despite the convenience of mobile communication devices, emergency service providers have been unable to leverage these capabilities to provide enhanced emergency communications in responding to emergency requests for assistance.

SUMMARY

Although an increasing number of emergency calls are made by modern communication devices, emergency services have failed to effectively respond to such requests for emergency assistance, oftentimes sending first responders to incorrect locations when seconds can mean the difference between life and death.

Accordingly, provided herein are systems, devices, and methods for providing autonomous extraction of digital information informative of an emergency situation. In some embodiments, digital information informative of an emergency situation is transmitted over at least one data channel between parties to an emergency communication session (e.g., a user device and an emergency service). In some embodiments, the digital information is transmitted over a data channel while a voice communication channel (e.g., voice call) is underway. In some embodiments, a digital processing device is capable of extracting user meta-data, location information, and other information from a data cache of the device and relaying this information to a dispatcher at an EDC or an emergency management system (EMS) during an emergency communication session.

In one aspect, provided herein are methods of detecting an emergency communication with an emergency service and providing digital information informative of an emergency situation to the emergency service by a digital processing device, the method comprising: a) autonomously detecting, by the digital processing device, the emergency communication with the emergency service; b) autonomously obtaining, by the digital processing device, digital information about the emergency situation; and c) autonomously providing, by the digital processing device, the digital information to the emergency service if the emergency communication is detected. In some embodiments, the emergency communication is an emergency call initiated through a native dialer of the digital processing device. In further embodiments, the emergency call initiated through the native dialer is performed by calling an emergency contact. In some embodiments, the emergency communication is initiated by a one touch calling option selected by a user of the digital processing device. In some embodiments, the emergency communication is a push notification from the emergency service requesting digital information. In some embodiments, the emergency communication is an SMS message. In some embodiments, the emergency communication is an emergency alert sent by the digital processing device to the emergency service. In some embodiments, the digital processing device provides updated digital information to the emergency service when a threshold condition is reached. In some embodiments, the digital information comprises information stored by the digital processing device. In some embodiments, the digital information comprises information from an associated device. In some embodiments, the digital information comprises information stored on a remote server. In some embodiments, the digital information comprises information stored on a computing device of a vehicle. In some embodiments, the digital information comprises at least one of user information, health information, sensor information, and location information. In some embodiments, the digital information comprises information from at least one of social media, email, browsing history, news, blog, online archive, census database, professional network, and online public record. In some embodiments, the digital information is transmitted to the emergency service through an alternate data channel during an ongoing communication session with the emergency service. In some embodiments, the digital processing device transmits the digital information to the emergency service periodically for a length of time. In some embodiments, the digital processing device transmits the digital information to the emergency service after emergency communications have terminated. In some embodiments, the digital processing device updates the digital information and transmits updated digital information to the emergency service autonomously or upon receiving a data request for updated digital information. In some embodiments, the digital information is transmitted via API-based encrypted HTTPS or via a data SMS. In further embodiments, the digital processing device chooses one of the API-based encrypted HTTPS and the data SMS based on ability to communicate with the emergency service. In some embodiments, the digital processing device is assigned a token pre-authenticating data requests tagged to the token, wherein the digital processing device transmits digital information in response to a data request tagged to the token. In some embodiments, the digital processing device transmits the digital information upon receiving a data request and authentication from the emergency service. In some embodiments, the digital processing device transmits the digital information only after a user of the digital processing device provides authorization. In some embodiments, the digital information comprises one or more of location information, sensor information, device information, user information, and social media information. In some embodiments, the digital information comprises location information for the digital processing device. In some embodiments, the digital information comprises sensor information for current health status of a user of the digital processing device. In some embodiments, the digital information comprises meta-data. In some embodiments, the digital information comprises one or more of past and current digital information. In some embodiments, the digital processing device obtains the digital information from at least one of a sensor on the digital processing device, a sensor in proximity to the digital processing device, a sensor associated with a communication device in proximity to the digital processing device, a sensor in a network with the digital processing device, and a sensor associated with a communication device in a network with the digital processing device. In some embodiments, the digital processing device detects the emergency communication during inactive mode, wherein detection of the emergency communication activates the digital processing device out of inactive mode. In some embodiments, the emergency situation is unrelated to the digital processing device or a user of the digital processing device, wherein the emergency communication comprises a data request from the emergency service for digital information about the emergency situation. In some embodiments, the digital processing device confirms that transmitted digital information has been successfully received by the emergency service. In some embodiments, the digital processing device re-transmits the digital information to the emergency service upon determining that the information has not been successfully received. In some embodiments, the digital processing device transmits the digital information in response to a data request sent by the emergency service after receiving a request for emergency assistance from the digital processing device. In some embodiments, the method comprises polling, by the digital processing device, the emergency service with heartbeat signals. In further embodiments, the digital processing device receives a response from the emergency service. In yet further embodiments, the digital processing device sends instructions to initiate data synchronization. In yet further embodiments, the response comprises a request for data synchronization. In still yet further embodiments, the digital processing device sends digital information to the emergency service periodically until data synchronization is complete.

In another aspect, provided herein are digital processing devices comprising at least one processor, a memory, a network component, and a computer program including instructions executable by the at least one processor to create an emergency application comprising: a) a communication detection module autonomously detecting an emergency communication with the emergency service; b) a data intake module autonomously obtaining digital information about an emergency situation associated with the emergency communication; and c) a data sharing module autonomously sharing digital information with the emergency service if the emergency communication is detected. In some embodiments, the emergency communication is an emergency call initiated through a native dialer of the digital processing device. In further embodiments, the emergency call initiated through the native dialer is performed by calling an emergency contact. In some embodiments, the emergency communication is initiated by a one touch calling option selected by a user of the digital processing device. In some embodiments, the emergency communication is a push notification from the emergency service requesting digital information. In some embodiments, the emergency communication is an SMS message. In some embodiments, the emergency communication is an emergency alert sent by the digital processing device to the emergency service. In some embodiments, the digital processing device provides updated digital information to the emergency service when a threshold condition is reached. In some embodiments, the digital information comprises information stored by the digital processing device. In some embodiments, the digital information comprises information from an associated device. In some embodiments, the digital information comprises information stored on a remote server. In some embodiments, the digital information comprises information stored on a computing device of a vehicle. In some embodiments, the digital information comprises at least one of user information, health information, sensor information, and location information. In some embodiments, the digital information comprises information from at least one of social media, email, browsing history, news, blog, online archive, census database, professional network, and online public record. In some embodiments, the digital information is transmitted to the emergency service through an alternate data channel during an ongoing communication session with the emergency service. In some embodiments, the digital processing device transmits the digital information to the emergency service periodically for a length of time. In some embodiments, the digital processing device transmits the digital information to the emergency service after emergency communications have terminated. In some embodiments, the digital processing device updates the digital information and transmits updated digital information to the emergency service autonomously or upon receiving a data request for updated digital information. In some embodiments, the digital information is transmitted via API-based encrypted HTTPS or via a data SMS. In further embodiments, the digital processing device chooses one of the API-based encrypted HTTPS and the data SMS based on ability to communicate with the emergency service. In some embodiments, the digital processing device is assigned a token pre-authenticating data requests tagged to the token, wherein the digital processing device transmits digital information in response to a data request tagged to the token. In some embodiments, the digital processing device transmits the digital information upon receiving a data request and authentication from the emergency service. In some embodiments, the digital processing device transmits the digital information only after a user of the digital processing device provides authorization. In some embodiments, the digital information comprises one or more of location information, sensor information, device information, user information, and social media information. In some embodiments, the digital information comprises location information for the digital processing device. In some embodiments, the digital information comprises sensor information for current health status of a user of the digital processing device. In some embodiments, the digital information comprises meta-data. In some embodiments, the digital information comprises one or more of past and current digital information. In some embodiments, the digital processing device obtains the digital information from at least one of a sensor on the digital processing device, a sensor in proximity to the digital processing device, a sensor associated with a communication device in proximity to the digital processing device, a sensor in a network with the digital processing device, and a sensor associated with a communication device in a network with the digital processing device. In some embodiments, the digital processing device detects the emergency communication during inactive mode, wherein detection of the emergency communication activates the digital processing device out of inactive mode. In some embodiments, the emergency situation is unrelated to the digital processing device or a user of the digital processing device, wherein the emergency communication comprises a data request from the emergency service for digital information about the emergency situation. In some embodiments, the digital processing device confirms that transmitted digital information has been successfully received by the emergency service. In some embodiments, the digital processing device re-transmits the digital information to the emergency service upon determining that the information has not been successfully received. In some embodiments, the digital processing device transmits the digital information in response to a data request sent by the emergency service after receiving a request for emergency assistance from the digital processing device. In some embodiments, the digital processing device polls the emergency service with heartbeat signals. In further embodiments, the digital processing device receives a response from the emergency service. In yet further embodiments, the digital processing device sends instructions to initiate data synchronization. In yet further embodiments, the response comprises a request for data synchronization. In still yet further embodiments, the digital processing device sends digital information to the emergency service periodically until data synchronization is complete.

In another aspect, provided herein are non-transitory computer-readable storage media encoded with a computer program including instructions executable by a processor to create an emergency application for a digital processing device, the application comprising: a) a communication detection module autonomously detecting an emergency communication with an emergency service; b) a data intake module autonomously obtaining digital information about an emergency situation associated with the emergency communication; and c) a data sharing module autonomously sharing digital information with the emergency service if the emergency communication is detected. In some embodiments, the emergency communication is an emergency call initiated through a native dialer of the digital processing device. In further embodiments, the emergency call initiated through the native dialer is performed by calling an emergency contact. In some embodiments, the emergency communication is initiated by a one touch calling option selected by a user of the digital processing device. In some embodiments, the emergency communication is a push notification from the emergency service requesting digital information. In some embodiments, the emergency communication is an SMS message. In some embodiments, the emergency communication is an emergency alert sent by the digital processing device to the emergency service. In some embodiments, the application provides updated digital information to the emergency service when a threshold condition is reached. In some embodiments, the digital information comprises information stored by the digital processing device. In some embodiments, the digital information comprises information from an associated device. In some embodiments, the digital information comprises information stored on a remote server. In some embodiments, the digital information comprises information stored on a computing device of a vehicle. In some embodiments, the digital information comprises at least one of user information, health information, sensor information, and location information. In some embodiments, the digital information comprises information from at least one of social media, email, browsing history, news, blog, online archive, census database, professional network, and online public record. In some embodiments, the digital information is transmitted to the emergency service through an alternate data channel during an ongoing communication session with the emergency service. In some embodiments, the application transmits the digital information to the emergency service periodically for a length of time. In some embodiments, the application transmits the digital information to the emergency service after emergency communications have terminated. In some embodiments, the application updates the digital information and transmits updated digital information to the emergency service autonomously or upon receiving a data request for updated digital information. In some embodiments, the digital information is transmitted via API-based encrypted HTTPS or via a data SMS. In further embodiments, the application chooses one of the API-based encrypted HTTPS and the data SMS based on ability to communicate with the emergency service. In some embodiments, the application is assigned a token pre-authenticating data requests tagged to the token, wherein the digital processing device transmits digital information in response to a data request tagged to the token. In some embodiments, the application transmits the digital information upon receiving a data request and authentication from the emergency service. In some embodiments, the application transmits the digital information only after a user of the digital processing device provides authorization. In some embodiments, the digital information comprises one or more of location information, sensor information, device information, user information, and social media information. In some embodiments, the digital information comprises location information for the digital processing device. In some embodiments, the digital information comprises sensor information for current health status of a user of the digital processing device. In some embodiments, the digital information comprises meta-data. In some embodiments, the digital information comprises one or more of past and current digital information. In some embodiments, the application obtains the digital information from at least one of a sensor on the digital processing device, a sensor in proximity to the digital processing device, a sensor associated with a communication device in proximity to the digital processing device, a sensor in a network with the digital processing device, and a sensor associated with a communication device in a network with the digital processing device. In some embodiments, the application detects the emergency communication during inactive mode, wherein detection of the emergency communication activates the digital processing device out of inactive mode. In some embodiments, the emergency situation is unrelated to the digital processing device or a user of the digital processing device, wherein the emergency communication comprises a data request from the emergency service for digital information about the emergency situation. In some embodiments, the application confirms that transmitted digital information has been successfully received by the emergency service. In some embodiments, the application re-transmits the digital information to the emergency service upon determining that the information has not been successfully received. In some embodiments, the application transmits the digital information in response to a data request sent by the emergency service after receiving a request for emergency assistance from the digital processing device. In some embodiments, the application polls the emergency service with heartbeat signals. In further embodiments, the application receives a response from the emergency service. In yet further embodiments, the application sends instructions to initiate data synchronization. In yet further embodiments, the response comprises a request for data synchronization. In still yet further embodiments, the application sends digital information to the emergency service periodically until data synchronization is complete.

In another aspect, provided herein are methods of obtaining digital information associated with an emergency situation from a digital processing device and providing the information to an emergency dispatch center, the method comprising: a) receiving, by an emergency management system, an emergency communication associated with an emergency situation for a user of a digital processing device; b) determining, by an emergency management system, that the emergency management system does not have current digital information associated with the emergency situation; c) sending, by an emergency management system, a request for digital information associated with the emergency situation to the digital processing device; d) obtaining, by an emergency management system, current digital information from the digital processing device; and e) providing, by an emergency management system, the current digital information to an emergency dispatch center. In some embodiments, the emergency communication is an emergency call initiated through a native dialer of the digital processing device. In further embodiments, the emergency call initiated through the native dialer is performed by calling an emergency contact. In some embodiments, the emergency communication is initiated by a one touch calling option selected by a user of the digital processing device. In some embodiments, the emergency communication is a push notification sent to the digital processing device by the emergency management system requesting digital information. In some embodiments, the emergency communication is an SMS message. In some embodiments, the emergency communication is an emergency alert sent by the digital processing device to the emergency management system. In some embodiments, the digital information comprises information stored by the digital processing device. In some embodiments, the digital information comprises information from an associated device. In some embodiments, the digital information comprises information stored on a remote server. In some embodiments, the digital information comprises information stored on a computing device of a vehicle. In some embodiments, the digital information comprises at least one of user information, health information, sensor information, and location information. In some embodiments, the digital information comprises information from at least one of social media, email, browsing history, news, blog, online archive, census database, professional network, and online public record. In some embodiments, the emergency management system receives the digital information through an alternate data channel during an ongoing communication session with the digital processing device. In some embodiments, the digital information is transmitted via API-based encrypted HTTPS or via a data SMS. In some embodiments, the emergency management system uses one of the API-based encrypted HTTPS and the data SMS based on ability to communicate with the digital processing device. In some embodiments, the request sent by the emergency management system comprises a token pre-authenticating the request, wherein the digital processing device transmits digital information in response to the request tagged to the token. In some embodiments, the digital processing device transmits the digital information upon receiving a data request and authentication from the emergency management system. In some embodiments, the digital information comprises one or more of location information, sensor information, device information, user information, and social media information. In some embodiments, the digital information comprises location information for the digital processing device. In some embodiments, the digital information comprises sensor information for current health status of a user of the digital processing device. In some embodiments, the digital information comprises meta-data. In some embodiments, the digital information comprises one or more of past and current digital information. In some embodiments, the digital information from the digital processing device is obtained from at least one of a sensor on the digital processing device, a sensor in proximity to the digital processing device, a sensor associated with a communication device in proximity to the digital processing device, a sensor in a network with the digital processing device, and a sensor associated with a communication device in a network with the digital processing device. In some embodiments, the method comprises receiving, by the emergency management system, heartbeat signals from the digital processing device. In further embodiments, the emergency management system sends a response to the heartbeat signals. In yet further embodiments, the emergency management system sends instructions to initiate data synchronization. In yet further embodiments, the emergency management system receives instructions to initiate data synchronization. In still yet further embodiments, the emergency management system receives digital information from the digital processing device periodically until data synchronization is complete.

In another aspect, provided herein are emergency management systems comprising at least one processor, a memory, a network component, and a computer program including instructions executable by the at least one processor to create a server software application for managing emergency communication sessions, the application comprising an emergency communication module establishing an emergency communication session, wherein the emergency communication module performs: a) receiving an emergency communication associated with an emergency situation for a user of a digital processing device; b) determining that the emergency management system does not have current digital information associated with the emergency situation; c) sending a request for digital information associated with the emergency situation to the digital processing device; d) obtaining current digital information from the digital processing device; and e) providing the current digital information to an emergency dispatch center. In some embodiments, the emergency communication is an emergency call initiated through a native dialer of the digital processing device. In further embodiments, the emergency call initiated through the native dialer is performed by calling an emergency contact. In some embodiments, the emergency communication is initiated by a one touch calling option selected by a user of the digital processing device. In some embodiments, the emergency communication is a push notification sent to the digital processing device by the emergency management system requesting digital information. In some embodiments, the emergency communication is an SMS message. In some embodiments, the emergency communication is an emergency alert sent by the digital processing device to the emergency management system. In some embodiments, the digital information comprises information stored by the digital processing device. In some embodiments, the digital information comprises information from an associated device. In some embodiments, the digital information comprises information stored on a remote server. In some embodiments, the digital information comprises information stored on a computing device of a vehicle. In some embodiments, the digital information comprises at least one of user information, health information, sensor information, and location information. In some embodiments, the digital information comprises information from at least one of social media, email, browsing history, news, blog, online archive, census database, professional network, and online public record. In some embodiments, the emergency management system receives the digital information through an alternate data channel during an ongoing communication session with the digital processing device. In some embodiments, the digital information is transmitted via API-based encrypted HTTPS or via a data SMS. In some embodiments, the emergency management system uses one of the API-based encrypted HTTPS and the data SMS based on ability to communicate with the digital processing device. In some embodiments, the request sent by the emergency management system comprises a token pre-authenticating the request, wherein the digital processing device transmits digital information in response to the request tagged to the token. In some embodiments, the digital processing device transmits the digital information upon receiving a data request and authentication from the emergency management system. In some embodiments, the digital information comprises one or more of location information, sensor information, device information, user information, and social media information. In some embodiments, the digital information comprises location information for the digital processing device. In some embodiments, the digital information comprises sensor information for current health status of a user of the digital processing device. In some embodiments, the digital information comprises meta-data. In some embodiments, the digital information comprises one or more of past and current digital information. In some embodiments, the digital information from the digital processing device is obtained from at least one of a sensor on the digital processing device, a sensor in proximity to the digital processing device, a sensor associated with a communication device in proximity to the digital processing device, a sensor in a network with the digital processing device, and a sensor associated with a communication device in a network with the digital processing device. In some embodiments, the emergency management system receives heartbeat signals from the digital processing device. In further embodiments, the emergency management system sends a response to the heartbeat signals. In yet further embodiments, the emergency management system sends instructions to initiate data synchronization. In yet further embodiments, the emergency management system receives instructions to initiate data synchronization. In still yet further embodiments, the emergency management system receives digital information from the digital processing device periodically until data synchronization is complete.

In another aspect, provided herein are non-transitory computer-readable storage media encoded with a computer program including instructions executable by a processor to create a server software application for managing emergency communication sessions, the application comprising an emergency communication module establishing an emergency communication session, wherein the emergency communication module performs: a) receiving an emergency communication associated with an emergency situation for a user of a digital processing device; b) determining that the emergency management system does not have current digital information associated with the emergency situation; c) sending a request for digital information associated with the emergency situation to the digital processing device; d) obtaining current digital information from the digital processing device; and e) providing the current digital information to an emergency dispatch center. In some embodiments, the emergency communication is an emergency call initiated through a native dialer of the digital processing device. In further embodiments, the emergency call initiated through the native dialer is performed by calling an emergency contact. In some embodiments, the emergency communication is initiated by a one touch calling option selected by a user of the digital processing device. In some embodiments, the emergency communication is a push notification sent to the digital processing device by the emergency management system requesting digital information. In some embodiments, the emergency communication is an SMS message. In some embodiments, the emergency communication is an emergency alert sent by the digital processing device to the emergency management system. In some embodiments, the digital information comprises information stored by the digital processing device. In some embodiments, the digital information comprises information from an associated device. In some embodiments, the digital information comprises information stored on a remote server. In some embodiments, the digital information comprises information stored on a computing device of a vehicle. In some embodiments, the digital information comprises at least one of user information, health information, sensor information, and location information. In some embodiments, the digital information comprises information from at least one of social media, email, browsing history, news, blog, online archive, census database, professional network, and online public record. In some embodiments, the emergency management system receives the digital information through an alternate data channel during an ongoing communication session with the digital processing device. In some embodiments, the digital information is transmitted via API-based encrypted HTTPS or via a data SMS. In some embodiments, the emergency management system uses one of the API-based encrypted HTTPS and the data SMS based on ability to communicate with the digital processing device. In some embodiments, the request sent by the emergency management system comprises a token pre-authenticating the request, wherein the digital processing device transmits digital information in response to the request tagged to the token. In some embodiments, the digital processing device transmits the digital information upon receiving a data request and authentication from the emergency management system. In some embodiments, the digital information comprises one or more of location information, sensor information, device information, user information, and social media information. In some embodiments, the digital information comprises location information for the digital processing device. In some embodiments, the digital information comprises sensor information for current health status of a user of the digital processing device. In some embodiments, the digital information comprises meta-data. In some embodiments, the digital information comprises one or more of past and current digital information. In some embodiments, the digital information from the digital processing device is obtained from at least one of a sensor on the digital processing device, a sensor in proximity to the digital processing device, a sensor associated with a communication device in proximity to the digital processing device, a sensor in a network with the digital processing device, and a sensor associated with a communication device in a network with the digital processing device. In some embodiments, the application receives heartbeat signals from the digital processing device. In further embodiments, the application sends a response to the heartbeat signals. In yet further embodiments, the application sends instructions to initiate data synchronization. In yet further embodiments, the application receives instructions to initiate data synchronization. In still yet further embodiments, the application receives digital information from the digital processing device periodically until data synchronization is complete.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
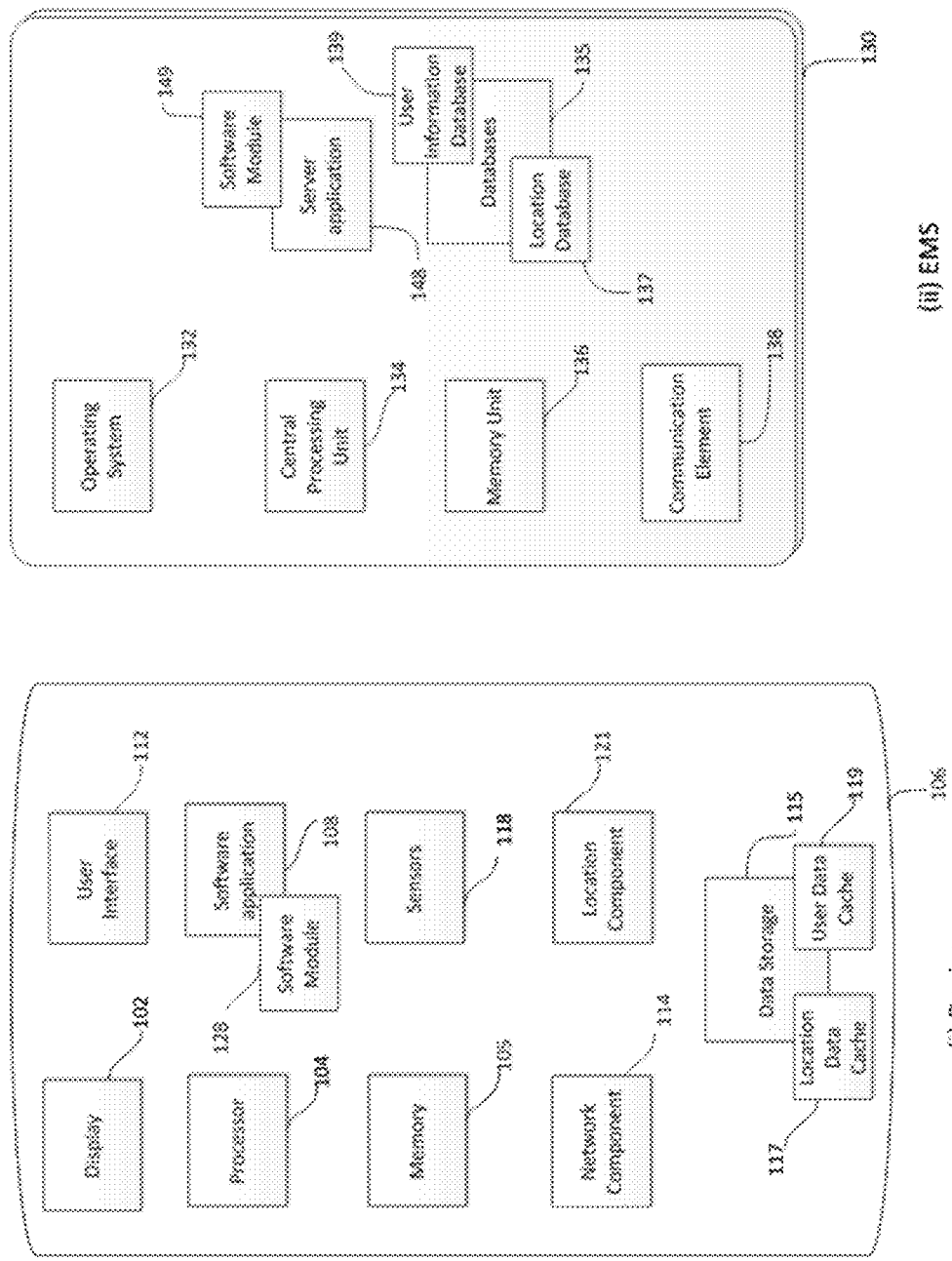
FIGS. 1A and 1B illustrate embodiments of the device, emergency management system, and software applications for the device and emergency management system.

In certain embodiments, provided herein are methods of detecting an emergency communication with an emergency service and providing digital information informative of an emergency situation to the emergency service by a digital processing device, the method comprising: a) autonomously detecting, by the digital processing device, the emergency communication with the emergency service; b) autonomously obtaining, by the digital processing device, digital information about the emergency situation; and c) autonomously providing, by the digital processing device, the digital information to the emergency service if the emergency communication is detected.

In certain embodiments, provided herein are digital processing devices comprising at least one processor, a memory, a network component, and a computer program including instructions executable by the at least one processor to create an emergency application comprising: a) a communication detection module autonomously detecting an emergency communication with the emergency service; b) a data intake module autonomously obtaining digital information about an emergency situation associated with the emergency communication; and c) a data sharing module autonomously sharing digital information with the emergency service if the emergency communication is detected.

In certain embodiments, provided herein are non-transitory computer-readable storage media encoded with a computer program including instructions executable by a processor to create an emergency application for a digital processing device, the application comprising: a) a communication detection module autonomously detecting an emergency communication with an emergency service; b) a data intake module autonomously obtaining digital information about an emergency situation associated with the emergency communication; and c) a data sharing module autonomously sharing digital information with the emergency service if the emergency communication is detected.

In certain embodiments, provided herein are methods of obtaining digital information associated with an emergency situation from a digital processing device and providing the information to an emergency dispatch center, the method comprising: a) receiving, by an emergency management system, an emergency communication associated with an emergency situation for a user of a digital processing device; b) determining, by an emergency management system, that the emergency management system does not have current digital information associated with the emergency situation; c) sending, by an emergency management system, a request for digital information associated with the emergency situation to the digital processing device; d) obtaining, by an emergency management system, current digital information from the digital processing device; and e) providing, by an emergency management system, the current digital information to an emergency dispatch center.

In certain embodiments, provided herein are emergency management systems comprising at least one processor, a memory, a network component, and a computer program including instructions executable by the at least one processor to create a server software application for managing emergency communication sessions, the application comprising an emergency communication module establishing an emergency communication session, wherein the emergency communication module performs: a) receiving an emergency communication associated with an emergency situation for a user of a digital processing device; b) determining that the emergency management system does not have current digital information associated with the emergency situation; c) sending a request for digital information associated with the emergency situation to the digital processing device; d) obtaining current digital information from the digital processing device; and e) providing the current digital information to an emergency dispatch center.

In certain embodiments, provided herein are non-transitory computer-readable storage media encoded with a computer program including instructions executable by a processor to create a server software application for managing emergency communication sessions, the application comprising an emergency communication module establishing an emergency communication session, wherein the emergency communication module performs: a) receiving an emergency communication associated with an emergency situation for a user of a digital processing device; b) determining that the emergency management system does not have current digital information associated with the emergency situation; c) sending a request for digital information associated with the emergency situation to the digital processing device; d) obtaining current digital information from the digital processing device; and e) providing the current digital information to an emergency dispatch center. In some embodiments, the emergency communication is an emergency call initiated through a native dialer of the digital processing device.

Certain Terminologies

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

As used herein, a "device" is a digital processing device designed with one or more functionality. A "communication device" refers to a device with a communication component, which will allow it to send and receive information over a wireless channel, a wired channel, or any combination thereof (e.g., sending/receiving information over the Internet). Exemplary communication devices include a mobile phone (e.g., a smartphone), a laptop, a desktop, a tablet, a radio (e.g., a two-way radio), and a vehicular communication system. In some embodiments, a communication device includes a car security system (e.g., OnStar®), a home security system, or a home control system (e.g., a networked control system for providing network controlled and/or smart temperature control such as a Wi-Fi smart thermostat, lighting, entertainment, and/or door control). In some embodiments, a communication device is a wearable device (e.g., a communication device worn by a user). In some embodiments, a communication (e.g., a wearable device) comprises one or more sensors. In some embodiments, a communication device is connected to a communication network, for example, a cellular network or the Internet. As used herein, a "mobile wireless device" refers to a device that is portable and communicates wirelessly. In some embodiments, a user wears or carries the mobile wireless device on the user's person or in the user's vehicle. Exemplary mobile wireless devices include mobile or cellular phones, wearable devices (e.g., smart watch, fitness tracker, wearable sensor, smart glasses, etc.).

As used herein, a "request for assistance" refers to a request or message sent to a recipient asking for help. In some embodiments, an emergency alert is a request for assistance. In some embodiments, an emergency alert comprises a request for assistance. In some embodiments, an emergency alert comprises a request for assistance and digital information associated with the request for assistance. In some embodiments, a request for assistance is an emergency request for assistance (e.g., the request is associated with an emergency situation). In some embodiments, a request for assistance is associated with an emergency situation. In some embodiments, a request for assistance comprises an emergency indication. In further embodiments, an emergency indication is selected from one or more of the group consisting of traffic accident, police emergency, medical emergency, and fire emergency. In some embodiments, a request for assistance is associated with a non-emergency situation (e.g., request for a tow truck after car breaks down). In some embodiments, a request for assistance is associated with a device sending the request. In other embodiments, a request for assistance is associated with a device not sending the request. As used herein, a request is "associated" with a device or user when the request relates to an emergency or non-emergency situation involving the device or user. In some embodiments, a request comprises data associated with a device (or user thereof). In some embodiments, a request comprises a data set associated with a device. For example, in some embodiments, a request comprises a data set associated with a device, wherein the data set comprises current location data. In other embodiments, a request for assistance is sent and/or received separately from data associated with a device. For example, in some embodiments, a request is sent first, and the recipient subsequently queries the device that sent the request for data or a data set associated with the emergency and/or device or user involved in the emergency. Alternatively, in some embodiments, a request is sent first, and the recipient subsequently queries the device associated with the emergency for data or a data set associated with the emergency and/or device or user involved in the emergency.

As used herein, a "first responder" refers to any person or persons responsible for addressing an emergency situation. In some embodiments, a first responder refers to government personnel responsible for addressing an emergency situation. In some embodiments, a first responder is responsible for a particular jurisdiction (e.g., a municipality, a township, a county, etc.). In some embodiments, a first responder is assigned to an emergency by an emergency dispatch center. In some embodiments, a first responder responds to a request for emergency assistance placed by a user via a user communication device. In some embodiments, a first responder includes one or more fire fighters, police officers, emergency medical personnel, community volunteers, private security, security personnel at a university, or other persons employed to protect and serve the public and/or certain subsets of the population.

As used herein, a "recipient" refers to one or more persons, services, or systems that receive a request for assistance. The recipient varies depending on the type of request. In some embodiments, a recipient is an emergency service. In some embodiments, a recipient is an emergency service when the request for assistance pertains to an emergency (e.g., a tier 2 emergency). In some embodiments, a recipient is an emergency management system. In some embodiments, a recipient is an emergency dispatch center. In exemplary embodiments, an emergency dispatch center is a public safety answering point which is a call center responsible for answering calls to an emergency phone number. In some embodiments, an emergency dispatch center is a private security dispatch center. In some embodiments, an emergency dispatch center is a non-public dispatch center. In some embodiments, a recipient is an emergency dispatch center, wherein the request is first routed through an emergency management system (e.g., request is sent to the EMS, but ultimately is sent to an EDC). In some embodiments, a recipient is a first responder (e.g., a communication device of a first responder). In some embodiments, a recipient is a non-emergency service or personnel, for example, a relative or friend. In such situations, a user of a communication device (or member device or second device) does not require emergency assistance, but does need help. As an example, a user of a member device in a group of devices is a child who is lost in a theme park. The parent of the child has a communication device in the same group of devices as the child's member device. The parent uses the communication device to send a request for assistance on behalf of the child's member device to theme park security officers who are closer to the child than the parent. Security is then able to pick up the child quickly using the data set associated with the member device, which they are given authorization to access by the parent's communication device.

As used herein, a "user" refers to one or more person or persons associated with a device (e.g., communication device, member device, second device, device of a first responder, etc). In some embodiments, a user utilizes a device to place a request for assistance. In some embodiments, user refers to one or more persons who are paid subscribers of a network access service, for example, cellular service subscribers. In some embodiments, a user refers to anyone who gains access to a network via a router, for example, a Wi-Fi router, and is not a paid subscriber of any access service. In some embodiments, a device associated with a user is a device carried or worn on the person of the user (e.g., a phone or wearable device). In some embodiments, a device associated with a user is not carried or worn on the person of the user (e.g., a home security sensor or camera installed in the home of the user, a vehicle tracking system installed in a vehicle of the user, etc).

As used herein, "data" refers to digital information. In some embodiments, data includes digital information about one or more entities (e.g., user of a user communication device) and/or an environment that pertains to characteristics of the one or more entities. In some embodiments, an entity is a person. In some embodiments, an entity is a thing (e.g., a house or a device). For example, in some embodiments, data comprises sensor data from home sensors associated with a house. In this example, the data is also associated with one or more persons (e.g., the homeowner(s) and/or inhabitant(s)). In some embodiments, data refers to meta-data. In some embodiments, data comprises health information about the user of a communication device. In some embodiments, data comprises information about the surrounding environment of the user of the user communication device (e.g., surrounding temperature, location, elevation, barometric pressure, ambient noise level, ambient light level, surrounding geography, etc.). In some embodiments, data comprises information about other users that is pre-stored in a device or in a database (e.g., a database within a group of devices who are related to the user of the user communication device as predefined by the user). In some embodiments, the data set comprises information from two or more users of user communication devices, wherein each user is affected by the current emergency situation. As an example, two unrelated users are involved in a vehicular collision, and each user sends a separate emergency request (for traffic accident) using his/her communication device. In this example, the separate emergency requests are associated (e.g., by an emergency management system and/or emergency dispatch center) with the same emergency based on the proximity of time, location, and emergency indication of the emergency requests. As a result, the data set for this accident comprises information from both user communication devices. In this example, the data set comprises location information from both devices (e.g., GPS coordinates), biosensor data for one or both devices (e.g., biosensor data such as heart rate and blood pressure can be important in case of injury), and information about the vehicle driven by each user (e.g., make, model, and year of manufacture information stored on the device). In some embodiments, data comprises current data. In further embodiments, current data comprises information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, current data comprises information that equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, data comprises historical data. In further embodiments, historical data comprises information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, or 60 minutes old, including increments therein. In further embodiments, historical data comprises information that equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, the age of information is calculated from the date the information is first collected (e.g., when a sensor first detects a sensed parameter such as, for example, heart rate).

As used herein, "data set" refers to a collection of digital information comprising the most recent and relevant information about an emergency situation and/or imminent emergency situation. Data set is used interchangeably with "meta-data set." In some embodiments, a "data set" comprises information about a user, information about a surrounding environment of the user and/or the user device. In some embodiments, the data set refers to a collection of information about an emergency situation not involving a user (e.g., emergency situation involves a device or something associated with the device). As an example, in one embodiment, when a home security device sends an emergency request (e.g., fire emergency based on internal thermostat sensor readings) to an emergency service (e.g., local fire department), the data set for the home security device comprises the sensor readings from one or more thermostats or heat sensors located around the home. In some embodiments, a data set is stored on a database or database cache of a device (e.g., communication device). In some embodiments, a data set is stored on a database or database cache external to a device (e.g., on a network). In some embodiments, a data set is stored on a database or database cache of an emergency management system.

As used herein, "emergency data" refers to digital information about a person or a situation that provide awareness about the emergency situation. In some embodiments, emergency data comprises information on devices involved in the emergency situation (e.g., devices belonging to persons involved in the emergency situation). In some embodiments, emergency data comprises the type of emergency (e.g., car accident, crime, medical emergency, or fire emergency), data associated with the user of the device requesting emergency assistance (e.g., location data for the user's device), data about other users in the vicinity of the user, and data about the devices involved in the emergency situation. In some embodiments, emergency data comprises one or more of location data, health data, user data, and sensor data.

Location data, as the term is used herein, refers to digital information for at least one of GPS location information, Wi-Fi based location information, location information manually entered by a user into the user's communication device, position information from the cellular network provider obtained via triangulation of the received signal strengths from three or more separate cellular phone base stations, location information derived from received signal strengths indicators (RSSI) received at a Wi-Fi router and/or signal strengths of signals received at a Wi-Fi router of digital signals sent from the user communication device, and any other form of location information. In some embodiments, location data comprises a location of a device determined using a location determination method. In further embodiments, a location determination method is selected from GPS satellite triangulation, cell tower triangulation, Wi-Fi triangulation, Bluetooth triangulation, RSSI, time-of-flight, angle of arrival, fingerprinting, barometric pressure, or any combination thereof. In some embodiments, location is determined using more than one method in combination to obtain a more accurate location. In some embodiments, location data comprises coordinates (e.g., XYZ coordinates, longitude, latitude, altitude, etc), an address (e.g., an address equivalent to coordinates that provides a current dispatchable location for emergency response). In some embodiments, location data comprises historical location (e.g., where user has traveled in the past). In some embodiments, historical location comprises one or more locations of the user and/or user device equal to or greater than 1, 2, 3, 4, 5, 10, 15, 20, 25, 30, 40, 50, or 60 minutes old, including increments therein. In some embodiments, the historical location comprises one or more locations of the user and/or user device equal to or greater than 1, 2, 3, 4, 5, 6, 7, 8, 9, 10, 11, 12, 13, 14, 15, 16, 17, 18, 19, 20, 21, 22, 23, or 24 hours old. In some embodiments, location data comprises current location, wherein current location comprises one or more locations of the user and/or user device within the past 1, 2, 3, 4, 5, 10, 15, 20, 25, 30, 40, 50, or 60 minutes, including increments therein. In some embodiments, location data comprises current location, wherein current location comprises one or more locations of the user and/or user device within the past 1, 2, 3, 4, 5, 6, 7, 8, 9, 10, 11, 12, 13, 14, 15, 16, 17, 18, 19, 20, 21, 22, 23, or 24 hours.

As used herein, "health data" refers to digital information associated with medical information of a user of a device. In some embodiments, health data comprises medical history such as, for example, past illnesses, surgery, food and/or drug allergies, diseases, disorders, medical diagnostic information (e.g., genetic profile screen), or any combination thereof. In some embodiments, health data comprises family medical history (e.g., family history of breast cancer). In some embodiments, health data comprises current health information such as, for example, current symptoms, current medications, and/or current illnesses or diseases. In some embodiments, health data comprises user age, height, weight, blood type, and/or other biometrics. In some embodiments, health data comprises a "limited data set" of identifiable patient information as defined by the Health Insurance Portability and Accountability Act (HIPAA) (e.g., for purposes of protecting patient confidentiality and/or privacy). In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, or 24 hours old. In some embodiments, medical history comprises medical information that is equal to or more than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old. In some embodiments, current health information comprises information that is equal to or less than 1, 2, 3, 4, 5, 6, 7, 8, 9, 10, 11, 12, 13, 14, 15, 16, 17, 18, 19, 20, 21, 22, 23, or 24 hours old. In some embodiments, current health information comprises medical information that is equal to or less than 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 days old.

As used herein, "user data" refers to digital information associated with a user of a device. In some embodiments, user data comprises user identity, user name, height, weight, eye color, hair color, ethnicity, national origin, religion, language(s) spoken, vision (e.g., whether user needs corrective lenses), home address, work address, occupation, family information, user contact information, emergency contact information, social security number, alien registration number, driver's license number, vehicle VIN, organ donor (e.g., whether user is an organ donor), or any combination thereof. In some embodiments, user data is obtained via user input.

As used herein, "sensor data" refers to digital information obtained or provided by one or more sensors. In some instances, a sensor is associated with a device (e.g., user has a communication device with a data link via Bluetooth with a wearable sensor, such as, for example, a heart rate monitor or a pedometer). Accordingly, in some embodiments, the device obtains sensor data from the sensor (e.g., heart rate from the heart rate monitor or distance traveled from the pedometer). In some instances, the sensor data is relevant to an emergency situation (e.g., heart rate during a cardiac emergency event). In some embodiments, a sensor and/or sensor device comprises an acoustic sensor, a breathalyzer, a carbon dioxide sensor, a carbon monoxide sensor, an infrared sensor, an oxygen sensor, an ozone monitor, a pH sensor, a smoke detector, a current sensor (e.g., detects electric current in a wire), a magnetometer, a metal detector, a radio direction finder, a voltage detector, an air flow meter, an anemometer, a flow sensor, a gas meter, a water meter, a Geiger counter, an altimeter, an air speed indicator, a depth gauge, a gyroscope, a compass, an odometer, a shock detector (e.g., on a football helmet to measure impact), a barometer, a pressure gauge (e.g., to estimate altitude for locating which floor a person is on during an emergency), a thermometer, a proximity sensor, a motion detector (e.g., in a home security system), an occupancy sensor, or any combination thereof, and in some embodiments, sensor data comprises information obtained from any of the preceding sensors. In some embodiments, a sensor is installed on a vehicle such as a car. In some embodiments, a vehicle sensor comprises one or more of an accelerometer, camera (e.g., providing photos and/or video feed), collision sensor, throttle position sensor, manifold absolute pressure sensor, engine coolant temperature sensor, mass air flow sensor, crankshaft position sensor, camshaft position sensor, detonation sensor, oxygen sensor, intake air temperature sensor, EGR position sensor, EGR temperature sensor, air-fuel ratio meter, blind spot monitor, curb feeler, defect detector, parking sensor, radar gun, speedometer, tire pressure sensor, torque sensor, transmission fluid temperature sensor, vehicle speed sensor, water sensor, and wheel speed sensor. In some embodiments, one or more sensors are physically separate from a user device. In further embodiments, the one or more sensors authorize the user device to obtain sensor data. In further embodiments, the one or more sensors provide or send sensor data to the user device autonomously. In some embodiments, the user device and the one or more sensors belong to the same group of devices, wherein member devices are authorized to share data. In some embodiments, a user device comprises one or more sensors (e.g., user device is a wearable device having a sensor or sensing component). In some embodiments, sensors are calibrated using one or more calibration standards or calibration process to provide known accuracies or uncertainties in the sensor values.

As used herein, "communication link" refers to a communication pathway from a device (e.g., communication device) to another device or to an intermediate device (e.g., a router) on a network. In some embodiments, the communication device establishes a communication link with another device or an intermediate device to transfer information (e.g., a location of the device) or to obtain information from a recipient such as, for example, location of a first responder assigned to a request for assistance associated with the communication device (e.g., device of first responder). A communication link refers to the point-to-point communication channels, point-to-point and end-to-end data sessions, and the physical hardware facilitating the communication channel(s) (e.g., antennas used to communicate/transmit information). In some embodiments, a data session comprises session parameters and the network route taken from one device to another device.

As used herein, a "data channel" refers to a communication session between two devices wherein data packets are exchanged between the devices. In some embodiments, a data session is setup using exchange of certain data packets, also called as "handshake signals," which are able to define the capabilities of the data session. For example, in some embodiments, the data session "handshake" provides for the ability to transfer multi-media data, voice data, and other data via the data session. In some embodiments, the data session is setup without the use of handshake signals, wherein the two devices involved share data packets according to a predefined protocol (e.g., a previously agreed upon protocol). In some embodiments, the data session is routed through an EMS, which stores the multi-media, voice, and/or other data from any of the devices that are part of the data session. In further embodiments, the EMS shares the data from the data session with the other device (e.g., device of a first responder). In some embodiments, the EMS manages the data session.

Device Modes and States

In some embodiments, the communication device is in one or more states when an emergency arises that prompts a user to request emergency assistance. For example, in some embodiments, when the communication device is powered ON, but in a hibernation or sleep state, the display is turned off. In some embodiments, the device comprises at least two modes. In some embodiments, the device comprises two modes. In some embodiments, the device comprises three modes. In some embodiments, device comprises an active mode. Active mode is characterized by the display being powered ON and presenting one or more interactive elements. In some embodiments, the device comprises an inactive mode. Inactive mode is characterized by the display being powered OFF and presenting no interactive elements. In a particular embodiment, the device comprises both an active mode and an inactive mode. In some embodiments, the user interacts with one or more physical interactive elements (e.g., hard buttons) on a device in inactive mode to initiate an emergency communication. In some embodiments, the user interacts with one or more non-physical interactive elements (e.g., soft buttons) on a device in active mode to initiate an emergency communication. In some embodiments, when the display is in inactive mode, the communication device is in one or more states of the device such as, for example, a sleep or hibernate state. In some embodiments, when the display is in active mode, the communication device is in one or more states of the device such as, for example, locked state, unlocked state (e.g., screen is unlocked and use can access fully functionality of the device), flight state, etc. Locked state refers to when the device is locked and inaccessible (e.g., user is unable to enter the right password). An unlocked state refers to the device after it has been unlocked and accessible (e.g., user entered the right password). Flight state refers to the device when communication is turned off (e.g., when the user has boarded an airplane about to take off and is instructed to turn off cellular, Wi-Fi, and Bluetooth communication).

In some embodiments, a device is in inactive mode when it detects an emergency communication. In some embodiments, a device is in active mode when it detects an emergency communication. In some embodiments, a device is in a locked state or an unlocked state when it detects an emergency communication. In various embodiments, the device responds to detection of the emergency communication by autonomously providing digital information such as location information of the device to an emergency service regardless of the device mode or state. In various embodiments, the device responds to a request for digital information from an emergency service by providing digital information such as location information of the device to an emergency service regardless of the device mode or state.

One Touch Emergency Communication

In some embodiments, an emergency communication is initiated by a digital processing device or an associated device via a one touch interaction by a user. In some embodiments, a device is configured to recognize a one touch interaction comprising a single user interaction, for example, touch, swipe, voice, tap or other forms of user interactions, as an initiation of a request for emergency assistance from a user of the communication device. In some embodiments, the user interaction is a one touch interaction from the user that causes the communication device to initiate a call requesting emergency assistance. In other embodiments, the user interaction is a sequence of two (dual touch) user interactions. In some embodiments, the communication device uses either a first or a second user interaction to authenticate or verify the identity of the user of the communication device. In some embodiments, the communication device sends a request for emergency assistance to an emergency service (e.g., emergency management system or emergency dispatch center) after user authentication. In some embodiments, the request comprises information or data about the user (e.g., user name, health records, emergency contact information, family information, or a combination thereof) that are relevant to emergency response personnel in providing emergency assistance to the user.

In some embodiments, the one touch process comprises any single interaction with a physical or non-physical interactive element of a digital processing device. For example, in one particular embodiment, a one-touch process comprises pressing the home button for at least 5 seconds. In some embodiments, a one touch interaction is a user interaction with a soft button on the device display. In some embodiments, a one touch interaction is a user interaction with a hard button on the device display. In some embodiments, an emergency communication is initiated via a voice command (e.g., "no touch" emergency communication/request). In some embodiments, the voice command is configured by a user. In some embodiments, the voice command provides voice authentication authorizing a user to send an emergency communication without requiring the user to unlock the device by, for example, entering a password.

Communication Detection Module

In some embodiments, a communication device comprises a software module for detecting a communication such as, for example, an emergency communication. In some embodiments, the software module is referred to as a communication detection module. In some embodiments, the one or more functions of the data sharing module are carried out by one or more other software modules described herein. In some embodiments, the communication detection module detects an emergency communication by detecting an ongoing emergency communication between the communication device and a recipient such as, for example, an emergency service. In some embodiments, the communication detection module detects an emergency communication by detecting a communication sent to or received from a recipient by the communication device. In some embodiments, the emergency communication is detected only if the communication was sent no more than 1, 2, 3, 4, 5, 6, 7, 8, 9, 10, 15, 20, 25, 30, 35, 40, 45, 50, 55, or 60 seconds before the current time (when detection is taking place), including increments therein. In some embodiments, the emergency communication is detected only if the communication was sent no more than 1, 2, 3, 4, 5, 6, 7, 8, 9, 10, 15, 20, 25, 30, 35, 40, 45, 50, 55, or 60 minutes before the current time, including increments therein.

In some embodiments, the communication detection module autonomously determines and/or confirms the emergency communication (e.g., without requiring user input). In some embodiments, the communication detection module determines and/or confirms the emergency communication by detecting a request for assistance sent by the member device (e.g., member device has already sent request for assistance).

In some embodiments, the emergency communication is an emergency call made by the native dialer of the digital processing device (e.g., a 9-1-1 call). In some embodiments, the communication detection module detects the call made by the native dialer. In some embodiments, the phone is unable to detect an emergency call made by the native dialer. As a result, in some embodiments, an emergency service receiving the emergency call then requests (e.g., via a push notification) digital information from the digital processing device, wherein the request is the emergency communication that is detected by the communication detection module. In some embodiments, the emergency call made by the native dialer is made to a saved emergency contact (e.g., 911, a local police station, fire station, hospital, private security service, or family member).

In some embodiments, the communication detection module detects an emergency communication between the digital processing device and an emergency service. In some embodiments, the communication detection module detects an emergency communication between a device other than the digital processing device and an emergency service. In further embodiments, the communication detection module detects an emergency communication between an associated device of the digital processing device and an emergency service. In some embodiments, an associated device is a cell phone, a wearable device (e.g., smart watch, fitness monitor, smart glasses, etc), a tablet, a laptop, a desktop computer, a networked sensor (e.g., sensor or device comprising a sensor connected to a network, aka an Internet of Things/IoT sensor), or a car console. In some embodiments, an associated device is a device a user has linked with the digital processing device to enable them to share data and/or communicate with each other during emergency situations. In some embodiments, a device is an associated device of the digital processing device if they are configured to share data and/or communicate with each other. In some embodiments, an associated device and the digital processing device are linked via at least one of a cellular connection, satellite, Bluetooth, Wi-Fi, and Internet. For example, in some embodiments, a user's cell phone and his smart watch are connected via a Bluetooth connection.

Data Intake Module

In some embodiments, a communication device comprises a software module for obtaining digital information about an emergency situation. In some embodiments, the software module is referred to as a data intake module. In some embodiments, the one or more functions of the data intake module are carried out by one or more other software modules described herein. In some embodiments, the digital information comprises at least one of sensor data, user data, health data, and location data as described elsewhere herein. In some embodiments, the data intake module obtains data (e.g., digital information) associated with the communication device and uses the data to update a data set associated with the communication device. In some embodiments, the data intake module autonomously obtains data for the communication device. In some embodiments, the data intake module obtains data for the communication device from a source other than the communication device. For example, in some embodiments, the data intake module obtains data from one or more sensors associated with the communication device (e.g., a wearable heart monitor having a Bluetooth connection with the communication device). In some embodiments, the source is an external sensor capable of communicating with the communication device either directly (e.g., via a Bluetooth or Wi-Fi connection) or indirectly (e.g., communicates via a router or intermediate device or over the Internet). In some embodiments, the source is an associated device of the communication device. For example, in some embodiments, an associated device is a wearable device, a cell phone, a panic button, or a sensor (e.g., security camera, digital thermometer, etc) in proximity to the communication device. In some embodiments, a device in proximity to the communication device has a location that is within 1, 2, 3, 4, 5, 6, 7, 8, 9, 10, 15, 20, 25, 30, 35, 40, 45, 50, 55, 60, 65, 70, 75, 80, 85, 90, 95, or 100 meters, including increments therein, of a location of the communication device.

In some embodiments, the data intake module obtains data periodically. In some embodiments, the data intake module obtains data aperiodically (e.g., not at regular intervals). In some embodiments, the data intake module obtains data continuously (e.g., constantly at short intervals such as, for example, every 5 seconds). In some embodiments, the data intake module comprises settings configurable by a user to determine what data is obtained (e.g., location data, user data, sensor data, or any combination of data), how the data is obtained (e.g., directly from the member device, indirectly from another member device, from a cache database storing data for the group of devices, from an EMS, etc), and how often the data is obtained (e.g., every X minutes or hours, or whenever the current location data changes). In some embodiments, periodicity of task is determined by utilizing algorithms for adjusting frequency, such as exponential back-off, based on a number of heuristics. For example, obtaining data may begin once per second and decrease to once per 10 seconds over a period of 10 minutes.

In some embodiments, the data intake module obtains data (e.g., a data set) comprising one or more categories of data. In some embodiments, data is selected from location data, health data, user data, sensor data, and any combination thereof.

Data Sharing Module

In some embodiments, a communication device comprises a software module for sharing digital information with a recipient (e.g., an emergency service). In some embodiments, the software module for sharing digital information is a data sharing module. In some embodiments, the data sharing module shares data autonomously. In some embodiments, the data sharing module shares data upon request by a recipient (e.g., an emergency service). In some embodiments, the data sharing module shares data upon user instruction (e.g., user input). For example, in some embodiments, the communication device receives a request to share location data from an emergency dispatch center. In some embodiments, the data sharing module shares data periodically. In some embodiments, data is shared periodically at an interval of about every 1, 2, 3, 4, 5, 6, 7, 8, 9, 10, 15, 20, 25, 30, 35, 40, 45, 50, 60, 70, 80, 90 or 100 seconds, including increments therein. In some embodiments, data is shared periodically at an interval of about every 1, 2, 3, 4, 5, 6, 7, 8, 9, 10, 15, 20, 25, 30, 35, 40, 45, 50, 60, 70, 80, 90 or 100 minutes, including increments therein. In some embodiments, data is shared periodically at an interval of about every 1, 2, 3, 4, 5, 6, 7, 8, 9, 10, 15, 20, 21, 22, 23, or 24 hours. In some embodiments, data is shared at least once every 1, 2, 3, 4, 5, 6, 7, 8, 9, 10, 15, 20, 25, 30, 35, 40, 45, 50, 60, 70, 80, 90 or 100 seconds, including increments therein. In some embodiments, data is shared at least once every 1, 2, 3, 4, 5, 6, 7, 8, 9, 10, 15, 20, 25, 30, 35, 40, 45, 50, 60, 70, 80, 90 or 100 minutes, including increments therein. In some embodiments, data is shared at least once every 1, 2, 3, 4, 5, 6, 7, 8, 9, 10, 11, 12, 13, 14, 15, 16, 17, 18, 19, 20, 21, 22, 23, or 24 hours. In some embodiments, the data sharing module shares data aperiodically (e.g., not at regular intervals). In some embodiments, the data sharing module shares data continuously (e.g., constantly at short intervals such as, for example, every 1-5 seconds). In some embodiments, periodicity of task is determined by utilizing algorithms for adjusting frequency, such as exponential back-off, based on a number of heuristics. For example, in For example, sharing may begin once per second and decrease to once per 10 seconds over a period of 10 minutes. In some embodiments, the data sharing module shares data with a recipient indirectly. For example, in some embodiments, data associated with a communication device is stored on one or more associated devices and/or on one or more external databases (e.g., on a network). Accordingly, in some embodiments, the data sharing module stores digital information on an associated device or on an external database. This is useful in situations when the communication device becomes unresponsive and/or has not authorized the member device to obtain data directly. In some embodiments, the data sharing module comprises settings configurable by a user to determine what data is shared (e.g., location data, user data, sensor data, or any combination of data), how the data is shared (e.g., directly with the member device, indirectly via another member device, via a cache database storing data for the group of devices, via an EMS, etc), and how often the data is shared (e.g., every X minutes or hours, or whenever the current location data changes).

In some embodiments, the data sharing module shares digital information updates as new information becomes available. In some embodiments, the data sharing module shares updated digital information when a threshold condition is reached. In some embodiments, a threshold condition is a time since digital information was last shared. For example, in the case of periodic data sharing described above, a threshold is a set time period for sharing data (see above time intervals for sharing data). In some embodiments, a threshold condition is a threshold distance between a current location of the digital processing device and the location shared in the previous data share/update. In some embodiments, a threshold distance is at least 1, 2, 3, 4, 5, 6, 7, 8, 9, 10, 15, 20, 25, 30, 35, 40, 45, 50, 55, 60, 65, 70, 75, 80, 85, 90, 95, 100, 150, 200, 250, 300, 350, 450, 500, 600, 700, 800, 900, 1000, or more meters, including increments therein. For example, in one scenario, the digital processing device has a threshold distance set at 20 meters. The previous data update provided a location for the device. When the digital processing device moves during the course of the emergency communications at least 20 meters away, the digital processing device threshold distance is triggered, and the device sends a digital information update comprising the new current location.

In some embodiments, the data sharing module shares digital information with an emergency service after polling the emergency service with "heartbeat signals." As used herein, heartbeat signals refers to periodic signals sent to an emergency service upon detection of an emergency communication. In response to receiving a confirmation from the emergency service of reception of a heartbeat signal, in some embodiments, the device sends instructions to begin data synchronization. For example, in some embodiments, the device has digital information that the emergency service lacks (e.g., current location information of the device). In some embodiments, the emergency service determines it lacks certain digital information and requests the information from the digital processing device. In some embodiments, the device sends digital information to the emergency service until data synchronization is complete. In some embodiments, the device polls the emergency service with heartbeat signals, receives a response with instructions for data synchronization, and sends digital information until data synchronization is complete. In some embodiments, the device polls the emergency service with heartbeat signals, receives a response, provides instructions for data synchronization, and sends digital information until data synchronization is complete.

Emergency Communication Module

In some embodiments, an emergency management system comprises a server software application comprising a software module for establishing a communication session between a communication device and a recipient of a request for assistance. In some embodiments, the software module is referred to as an emergency communication module. It is understood that one or more functions of the emergency communication module is capable of being performed by one or more other software modules described herein. In some embodiments, the emergency communication module forwards or the request for assistance to another recipient (e.g., an EDC, PSAP, first responder, private security service, friend or relative, etc.). In some embodiments, the emergency management system is an intermediary recipient that facilitates communications between a communication device requesting assistance and an end recipient such as, for example, a PSAP. In some embodiments, the emergency communication module provides digital information associated with the communication device to the recipient. In some embodiments, the emergency management system uses digital location information associated with the communication device to identify an EDC (e.g., a PSAP) serving the jurisdiction where the communication device is located before the emergency management system contacts the EDC. In some embodiments, the emergency management system provides additional digital information relevant and/or useful to facilitating the emergency response (e.g., medical data relevant to a medical emergency) to the recipient.

DETAILED FIGURE DESCRIPTIONS

FIG. 1A shows a schematic diagram of one embodiment of a device described herein. In some embodiments, the device 106 is an electronic device such as a communication device (e.g., mobile or cellular phone, computer, laptop, etc.). In some embodiments, a communication device is a wearable device. In some embodiments, a communication device is a wireless mobile device or a smart phone. In some embodiments, a communication device is a walkie-talkie or a two-way radio. In some embodiments, a user 100 (not shown) is selected from one or more persons who are the primary users of the device 106.

In some embodiments, the device 106 comprises at least one processor 104, a memory 105 (e.g., an EPROM memory, a RAM, a solid-state memory), a display 102, a user interface 112, a network component 114 (e.g., an antenna and associated components, Wi-Fi adapters, Bluetooth® adapters, etc.) and a software application 108 (e.g., mobile application, computer program, application). In some embodiments, the software application comprises one or more software modules 128. In some embodiments, the device is equipped with a location component 121, for example, a global positioning system (GPS). In some embodiments, the device comprises data storage 115. In further embodiments, the device comprises a location data cache 117. In further embodiments, the device comprises a user data cache 119.

In some embodiments, the device 106 has several components including a display 102 and user interface 112, which allow the user 100 to interact with the device 106. In some embodiments, the display 102 is a part of the user interface 112 (e.g., a touchscreen is both a display and provides an interface to accept user interactions). In some embodiments, the display 102 and/or the user interface 112 comprises a touch screen (e.g., a capacitive touch screen), which is capable of displaying information and receiving user input. In some embodiments, the device 106 comprises hardware components not including a display 102 and a user interface 112, wherein the device functions autonomously without requiring active user guidance or interaction. In some embodiments, data may be obtained from devices without a user interface, such as a health monitoring device or environmental monitoring device. In some embodiments, the monitoring device has one or more sensors for sensing health parameters of a user or environmental parameters. In some embodiments, the health monitoring and can be controlled remotely by a medical professional.

In some embodiments, a device 106 includes various accessories 122 (not shown) that allow additional functionality. In some embodiments, the accessories 122 (not shown) include one or more of the following: microphone (e.g., for user voice interaction), a camera (e.g., for input of gestures commands or pictures from the user 100), speakers, one or more sensors such as a fingerprint reader or scanner, USB/micro-USB port, headphone jack, a card reader, SIM card slot, Bluetooth button, and any combination thereof.

FIG. 1A also shows a schematic diagram of one embodiment of an emergency management system 130 as described herein. In some embodiments, the emergency management system 130 comprises one or more of an operating system 132, at least one central processing unit or processor 134, a memory unit 136, a communication element 138, and a server application 148 (e.g., server application). In some embodiments, the server application 148 comprises one or more software modules 149. In some embodiments, the emergency management system 130 comprises one or more databases 135. In some embodiments, the emergency management system 130 comprises a location database 137. In some embodiments, the emergency management system 130 comprises a user information database 139.

Figure 1B:
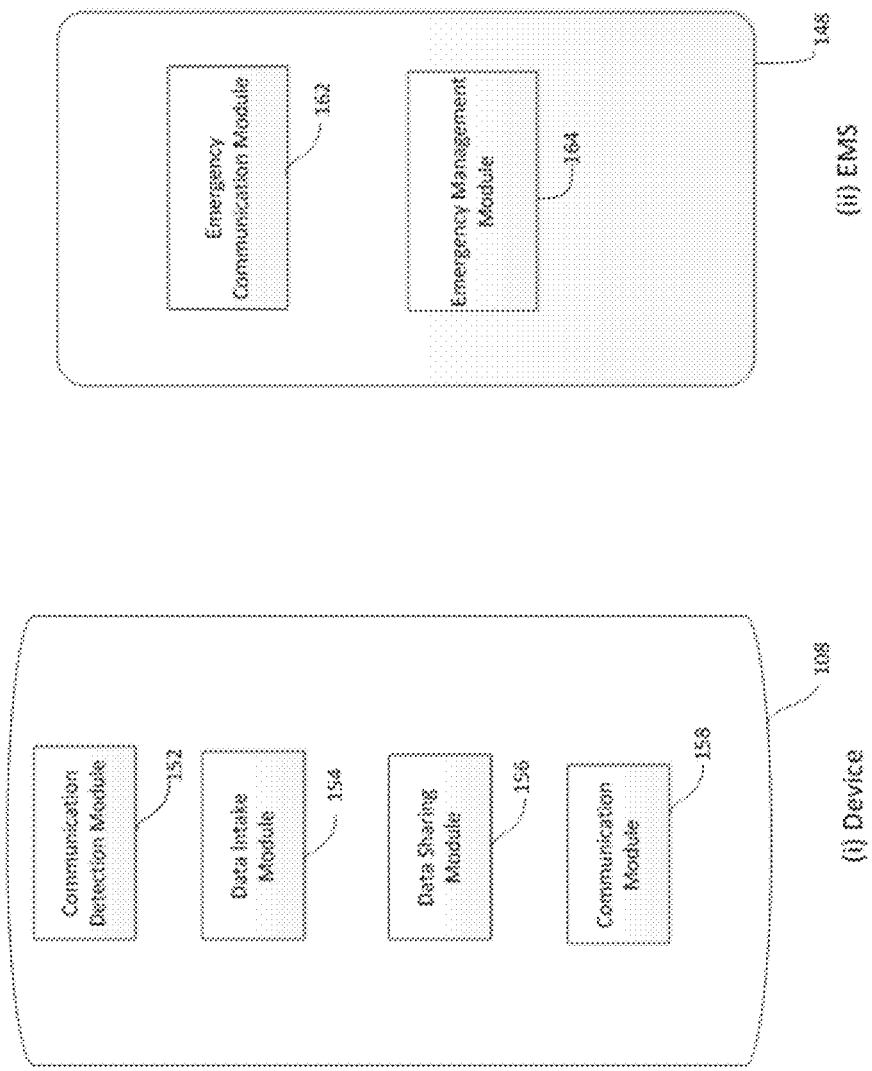

FIG. 1B shows a schematic diagram of one embodiment of a software application 108 installed on a device. In some embodiments, the software application 108 comprises one or more software modules. In some embodiments, a software module is a communication detection module 152, a data intake module 154, a data sharing module 156, or a communication module 158.

FIG. 1B also shows a schematic diagram of one embodiment of a server application 148 installed on a server (e.g., a server in an EMS). In some embodiments, the server application 148 comprises one or more server software modules. In some embodiments, a software module is an emergency communication module 162 or an emergency management module 164.

Figure 2:
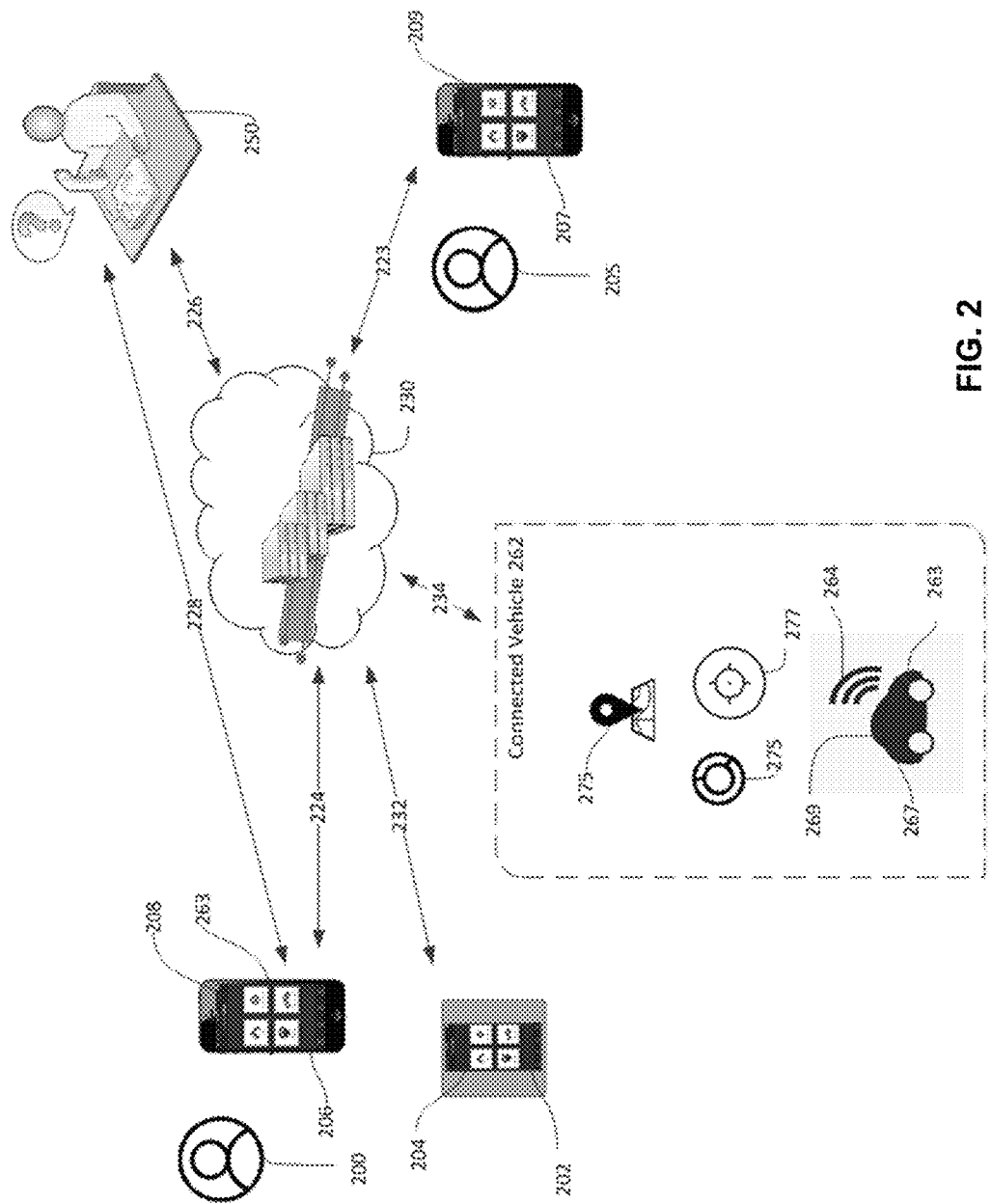
FIG. 2 illustrates an embodiment of a system, including devices and an emergency management system, for obtaining digital information associated with an emergency situation.

FIG. 2 illustrates an embodiment of a system, including devices and an emergency management system, for sharing digital information associated with an emergency situation. In some embodiments, a user initiates an emergency session (e.g., an emergency call) via a device (e.g., a mobile phone 206). In some embodiments, the user 200 is the primary user of multiple devices (e.g., mobile phone 206, wearable device 202, connected vehicle 262) with software (208, 204, 269), which may be capable of detecting an emergency session and transmitting data regarding the emergency.

In some embodiments, the device 206 includes a network component 263 (e.g., a Wi-Fi antenna, cellular antenna, or a Bluetooth antenna, not shown) which initiates the emergency session using the device's native capabilities (e.g., native dialer). In some embodiments, the device 206 is a device with a one-button emergency calling button, emergency session button or panic button, etc. In some embodiments, the emergency alert is sent in via one or more of the internet, cellular network, and landline network. For example, in some embodiments, the emergency call is sent via an API call over the Internet to the PSAP. In some embodiments, the alert is an SMS notification to the PSAP 250. Generally, if data signal is strong, data API calls are generally preferred because of good data transfer rates for sending the alert quickly. If data signal is not good (e.g., weak, intermittent, disconnected), SMS and other methods are optionally used as a fallback for sending the emergency alert.

In some embodiments, the device 206 includes a computer program 208 for sending the data regarding the emergency situation. In some embodiments, the computer program 208 is pre-installed on the device or is loaded and/or installed by the user 200. In some embodiments, the user 200 goes through a setup or registration process for the device 206, where he or she provides user data such as emergency contacts (e.g., phone numbers, email addresses, messaging IDs), location (e.g., home address, work address, a physical address of the location of the device 206), and other user information. In some embodiments, user data, location data, emergency data, and other data are saved in a data cache or storage 215 (not shown) in the device 206. In other embodiments, the data is saved in one or more databases 235 (not shown) in the EMS, in third-party servers or in cloud-based systems. In some embodiments, the data is protected by password protection, authentication protocols for transmission, encryption, use of secured pathways, or other security protocols, to limit risk of security breaches.

In some embodiments, the emergency session is initiated by user input, which optionally involves the user (e.g., user 200) interacting with the user interface 263 of the device 206. In some cases, the user presses one or more hard or soft buttons on the user interface 263. However, other types of user interactions such as touch, tap, pattern of touches, gesture, and voice-activation are also contemplated.

In some embodiments, when the device 206 is a mobile phone, the emergency communication is sent via a cellular connection through a carrier network. In some embodiments, a voice call is initiated via a direct communication link 228 with a public safety access/answering point (PSAP) 250. In some embodiments, communication links 224 and 226 are used for sending data such as user data, location data, emergency data, text, images, and video from the device 206. In some embodiments, communication links 224 and 226 are established via landline, cellular network or the Internet.

In some embodiments, once the device 206 detects that there is an on-going emergency session, it autonomously obtains and transmits data regarding the emergency situation in a periodic and continual basis during the emergency session. In some cases, the device 206 continues to obtain and transmit for some time after the emergency session has ended based on a delay timer. In some embodiments, the device obtains location data from the location component 217 (e.g., GPS, not shown). In some embodiments, the device 206 obtains static user data from storage 215 (not shown) and sensor data from one or more sensors 118 (not shown). "Static data" refers to data that is not likely to change frequently (e.g., user name, phone number, home address, etc.). "Dynamic data" refers to data that is changing frequently (e.g., device location, user's pulse rate, other sensor data, etc.).

In some embodiments, the EMS 230 obtains data regarding the emergency from other user devices (e.g., associated devices) such as, for example, a wearable device 202 or a connected vehicle 262 by sending push notifications or SMS through communication links 232 and 234. In some embodiments, the wearable device 202 includes software 204, optionally a locationing component and one or more sensors (not shown). In some embodiments, the wearable device 202 is capable of hosting an emergency session with a PSAP initiated by user input. In other embodiments, the wearable device 202 does not have the hardware, software or network connectivity to host a native emergency session with a PSAP. In some embodiments, after detecting the emergency session through link 228 based on the push notification, the wearable device 202 obtains and transmits the data through secure and encrypted pathways to the EMS and finally to the PSAP (links 232, 234, 226).

FIG. 2 shows an exemplary embodiment of a connected vehicle 262 (e.g., a vehicle console, electronic control unit, engine control unit, or engine control module) with a computer program 269 for emergency data sharing. In some embodiments, one or more sensors (e.g., electromagnetic sensors, ultrasonic sensors, pressure sensors, gyroscopes), storage 275, and locationing component 277 (e.g., GPS) are located or installed in the connected vehicle 262. When the connected vehicle 262 receives the push notification via link 234, it optionally gathers data from one or more components (e.g., a sensor) and autonomously transmits the data. For example, in some embodiments, location data 275 is obtained from the GPS 277 (current location data) and storage 275 (historical location data). For dynamic data, the vehicle 262 optionally provides updated data periodically and/or on a continual basis.

In some cases, data regarding the emergency is hosted on another user's device (as opposed to user 200 who is making the emergency call), such as a device 207 of the user 205. In some embodiments, the EMS 230 sends push notification to a device 207 (with software 209) to obtain data from that device 207. For example, in some embodiments, the user 200 via device 206 makes an emergency call on behalf of another user 205 (proxy calling). In such a situation, the location of device 207 is obtained for sending the emergency response to the correct location. In some embodiments, the location data is transmitted through secure and encrypted pathways to the EMS and finally to the PSAP (links 223, 226).

Figure 3A:
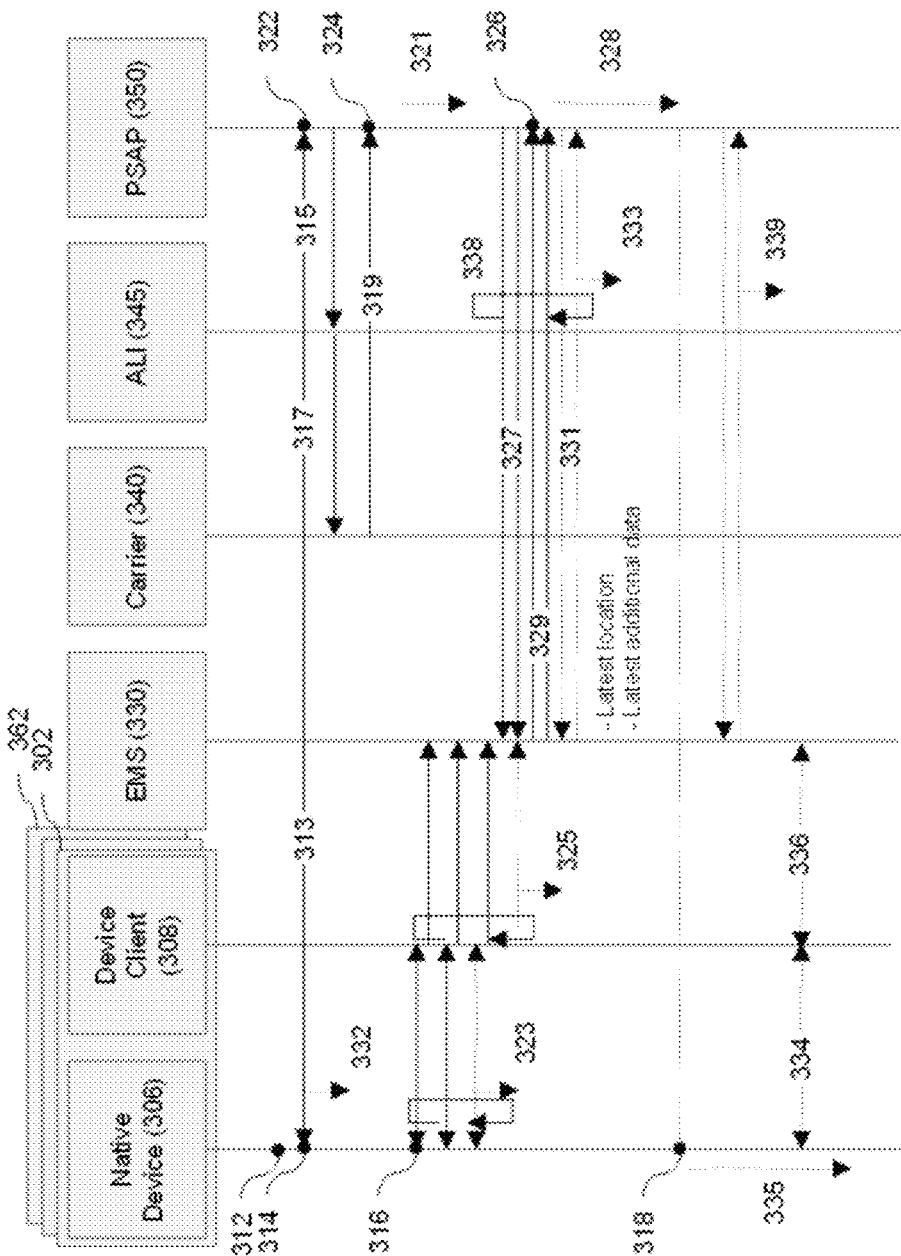
FIGS. 3A, 3B, and 3C illustrate how digital information associated with an emergency situation will be obtained in different scenarios.

FIG. 3A illustrates an exemplary embodiment of a process for autonomous digital information sharing when the data connection is good. In some embodiments, the device 306 autonomously detects an emergency communication, autonomously obtains digital information regarding the emergency and autonomously transmits the same without user input. As a result, the device 306 is able to provide relevant information for a quick and efficient emergency response.

As shown in the ladder diagram depicted in FIG. 3A, an emergency (act 312) occurs and a user initiates an emergency communication (e.g., an emergency call 313, chat session, SMS session, etc.) using a device 306 (e.g., mobile phone) with an emergency service (e.g., PSAP 350). In some embodiments, the device 306 is a mobile phone with a computer program 306. In some embodiments, the device 306 simultaneously obtains data from other devices (e.g., an associated device such as a mobile phone or a wearable connected to the user device 306 via a Bluetooth communication link). In some embodiments, data is obtained from other devices simultaneously, such as wearable device 302 and connected vehicle 362, which are optionally associated with the same user. In some embodiments, a notable device-side temporal event is selected from the group consisting of: emergency situation arises (act 312); native 9-1-1, SMS 9-1-1 or other connection initiated (act 314), software automatically activated (act 316), and hang-up/call end (act 318). In some embodiments, a notable PSAP-side temporal event is selected from the group consisting of: call received (e.g., with WPH1 COS) (act 322), call back number (CBN) obtained (act 324), software integration—API calls, information received (act 326), and hang-up/call end (act 328).

In some embodiments, the device 306 initiates the emergency call 313 using native capabilities (act 314) based on the operating system and built-in software. In some embodiments, the emergency call is a cell dial to 9-1-1 or another emergency number, Wi-Fi dial, VoIP session, or SMS exchange with PSAP 350.

In some embodiments, the emergency call 313 is received (act 322) at the PSAP 350 following the E911 (enhanced 911) flow using a pseudo-automatic number identification (pANI) of the incoming call. Next, the local Automatic Location Information (ALI 345) database is queried using the pANI using ALI lookup 315. In a legacy positioning method, the device service provider or carrier 340 is the network carrier that has originated the emergency call 313 and a locationing request is "steered" or forwarded to the carrier entity (MPC/GMLC) represented by steering 317. In this legacy positioning method, in some embodiments, the carrier 340 returns an estimate of the location of the device 306 (e.g., location of the nearest cell tower 319) as well as a call back number (CBN) (act 324). In newer systems such as NG911 (next generation 911), the steps in 315, 317 and 319 for obtaining the CBN can vary. In some embodiments, other variations in the flow occur in existing systems.

In some embodiments, the device 306 includes a device client or computer program 308 and may be downloaded or pre-installed software for call detection and data synchronization. In some embodiments, the device 206 (e.g., a mobile phone with Android operating system) has a computer program 308, which utilizes mechanisms for getting notified of telephony events (e.g., begin call, end call, etc.). In some embodiments, a list of emergency numbers for various jurisdictions are maintained by the device 306 or EMS 330, so that the native dialed number recognized by the device 306 as an emergency number for detecting an emergency session. In some embodiments, the list of emergency numbers are user-defined, obtained from third party data bases, etc. In some embodiments, the list include numbers for third party recipients such as a home security company, taxi fleet management company, corporate or university security, emergency contacts, or other recipients. In some embodiments, after an emergency session is detected (act 332), the device 306 begins obtaining data regarding the emergency situation. In some embodiments, the device 306 collects the data from one or more components and/or sensors of the device by data synchronization (act 323). For example, in some embodiments, the data comprises location data (x, y coordinates) from the GPS in the device 306. In some embodiments, the data comprises user data such as user name, user medical conditions, user address, and other user information. In some embodiments, the data comprises emergency data such as a name and contact information for emergency contacts. In some embodiments, the data comprises health data such as a user's medical conditions, list of medications, and drug allergies.

In some embodiments, the data comprises sensor data of one or more environmental and/or health parameters. In some embodiments, the environmental parameter is selected from the group consisting of: light, motion, temperature, pressure, humidity, vibration, magnetic field, sound, smoke, carbon monoxide, radiation, hazardous chemicals, acid, base, reactive compounds, volatile organic compounds, and smog. In some embodiments, health parameters may include heart rate, pulse, electric signals from the heart, blood oxygen levels, blood pressure, blood sugar level, and other health parameters, etc.

In some embodiments, once the data has been obtained from the device 306 by computer program 308, the data is stored in one or more storage locations such as a cache or database (not shown). In some embodiments, the data is saved in the EMS 330, in the cloud or a remote server. Once an emergency session is detected, in some embodiments, the data synchronization 323 and data storage is performed periodically and on a continual basis until after some time period after the emergency session has ended. In some embodiments, data synchronization and/or data storage continues until a time period (e.g., delay timer) of at least 1, 2, 3, 4, 5, 6, 7, 8, 9, 10, 15, 20, 25, 30, 35, 40, 45, 50, 55, or 60 seconds or more, including increments therein, after the emergency session has ended. In some embodiments, data synchronization and/or data storage continues until a time period (e.g., delay timer) of at least 1, 2, 3, 4, 5, 6, 7, 8, 9, 10, 15, 20, 25, 30, 35, 40, 45, 50, 55, or 60 minutes or more, including increments therein, after the emergency session has ended. For example, in some embodiments, after the call has ended (act 318), these processes continue until data sync stops (act 334) after a delay timer 335 has elapsed.

In some cases, at the PSAP 350, there is partial or complete software integration with the EMS 330. In some embodiments, the software integration includes call-taking software or hardware, CAD software or hardware, etc. In some embodiments, a query is sent to the EMS 330 with the CBN (act 338). In some embodiments, after obtaining the CBN, the PSAP sends a query within a short amount of time 321 (e.g., 500 ms). In some embodiments, the query is in modern REST with JavaScript Object Notation (JSON) or another open-standard format, the HTTP-Enabled Location Delivery (HELD) protocol with XML. In some embodiments, the data is encrypted during transmission (by e.g., Transport Layer Security or TLS) via secured pathway 327. In some embodiments, the data transmission is authenticated and access is limited to specific credentials depending on the software at the PSAP 350. In some embodiments, queries from the PSAP 350 are periodic and sent on a continual basis. In some embodiments, the PSAP 350 software allows adjusting the timing and periodicity of the queries and/or allows for manual retries by PSAP 350 operators.

After the data is synced (act 323), it is transmitted to the EMS and stored (act 325). In some embodiments, the data is transferred using encryption to reduce risk of data breach. In some embodiments, the data is transmitted via Representational State Transfer (REST) methods with encryption over data networks with HTTP. In some embodiments, the data is transmitted via text or data SMS or other known methods. It is contemplated that the device 306 optionally chooses the method of transmission based on various factors such as data network or Wi-Fi signal strength, battery life, etc. For example, in some embodiments, when the battery level is low, the device 306 chooses to send data by SMS and reduce periodicity of the data transmission. In some embodiments, SMS is not preferred because of size limits for messages.

At the EMS 330, the data is optionally stored in one or more databases or caches. In some embodiments, the database is a relational database with time-stamped columns such as user name, CBN, location data, sensor data, saved user data, and other information. In some embodiments, the data is saved in a non-relational or NoSQL database associated with a time-stamp and CBN. In some embodiments, the categories of data are selected from the group consisting of: altitude, call start time, caller ID, extra info, aml, cell carrier, device IMEI, device model, device number, emergency number, location accuracy, location altitude, location latitude, location longitude, location time, place address, source, time, registered address, registered engine, and uncertainty radius. An exemplary payload from an entry in a NoSQL database is depicted in Table 1.

TABLE 1

Exemplary Payload from NoSQL Database Entry

| Data Type | Payload |
| --- | --- |
| altitude | 0 |
| call_start_time | 1489599274768 |
| caller_id | 17742082168 |
| created_time | 1489599274768 |
| extra_info | — |
| aml | — |
| cell_carrier | AT&T |
| device_imei | 352331081130125 |
| device_model | SAMSUNG-SM-G935A |
| device_number | 17742082168 |
| emergency_number | 14158911911 |
| location_accuracy | 25.108 |
| location_altitude | 0 |
| location_latitude | 40.7545846 |
| location_longitude | −73.989954 |
| location_time | 1489599274768 |
| place_address | 240 West 39th Street, New York, NY 10018, USA |
| source | Call |
| time | 1489599274768 |
| v | 2 |
| latitude | 40.7545846 |
| longitude | −73.989954 |
| rg_address | 240 West 39th Street, New York, NY 10018, USA |
| rg_engine | Google |
| source | aml |
| uncertainty_radius | 25.108 |

In some embodiments, when the EMS 330 receives the query with the CBN, it attempts to match the query with the data received from the device 306 stored in one or more databases. In some embodiments, the data is matched and sent to the PSAP using secured pathway 329. For static data (e.g., user name, home address, etc.), transmission of the data is optionally carried out for a limited number of times or only once. For dynamic data such as the latest location data and latest additional data such as sensor data are transmitted, in some cases, periodically. In some embodiments, the queries are periodically sent while the emergency session is on-going and continues automated or manual retries for some time after the emergency session has been terminated—i.e., the data transfer is periodic and continuous until stopped 333. After some time after the session has ended, only manual retries for queries are allowed 339.

In some embodiments, the delay timer allows data transmission even after the emergency session has ended (act 318) to overcome a poor or intermittent data connection. In this way, the data continues to be updated and available even if the connection has been inadvertently lost. In addition, the data continues to be updated for some time (e.g., delay timer) while the emergency response is on route to keep track of the device. In addition, some devices are in "limited data connectivity" mode during the emergency call and are unable to transmit data during the session (see emergency mode in the 3GPP standards). Therefore, continued data updating and transmission after the emergency call has ended is necessary in some embodiments where the device has limited data connectivity. In some embodiments, the delay timer is between 1 second to 200 seconds, preferably between 20 seconds to one minute. In some embodiments, the delay timer is about 30 seconds. In some embodiments, the delay timer is set to zero.

In some embodiments, the timing and periodicity of the data synchronization, data storage and data transmission are optionally adjusted by the user, device, EMS or another party. In some embodiments, the periodicity of data synchronization and transmission is set between 1 second and 100 seconds, preferably between 1 second to 10 seconds. In some embodiments, the periodicity is set to 5 seconds. In some embodiments, the periodicity is about 1 second to about 120 seconds. In some embodiments, the periodicity is at least about 1 second. In some embodiments, the periodicity is at most about 120 seconds. In some embodiments, the periodicity is about 1 second to about 5 seconds, about 1 second to about 10 seconds, about 1 second to about 15 seconds, about 1 second to about 20 seconds, about 1 second to about 25 seconds, about 1 second to about 30 seconds, about 1 second to about 40 seconds, about 1 second to about 50 seconds, about 1 second to about 60 seconds, about 1 second to about 90 seconds, about 1 second to about 120 seconds, about 5 seconds to about 10 seconds, about 5 seconds to about 15 seconds, about 5 seconds to about 20 seconds, about 5 seconds to about 25 seconds, about 5 seconds to about 30 seconds, about 5 seconds to about 40 seconds, about 5 seconds to about 50 seconds, about 5 seconds to about 60 seconds, about 5 seconds to about 90 seconds, about 5 seconds to about 120 seconds, about 10 seconds to about 15 seconds, about 10 seconds to about 20 seconds, about 10 seconds to about 25 seconds, about 10 seconds to about 30 seconds, about 10 seconds to about 40 seconds, about 10 seconds to about 50 seconds, about 10 seconds to about 60 seconds, about 10 seconds to about 90 seconds, about 10 seconds to about 120 seconds, about 15 seconds to about 20 seconds, about 15 seconds to about 25 seconds, about 15 seconds to about 30 seconds, about 15 seconds to about 40 seconds, about 15 seconds to about 50 seconds, about 15 seconds to about 60 seconds, about 15 seconds to about 90 seconds, about 15 seconds to about 120 seconds, about 20 seconds to about 25 seconds, about 20 seconds to about 30 seconds, about 20 seconds to about 40 seconds, about 20 seconds to about 50 seconds, about 20 seconds to about 60 seconds, about 20 seconds to about 90 seconds, about 20 seconds to about 120 seconds, about 25 seconds to about 30 seconds, about 25 seconds to about 40 seconds, about 25 seconds to about 50 seconds, about 25 seconds to about 60 seconds, about 25 seconds to about 90 seconds, about 25 seconds to about 120 seconds, about 30 seconds to about 40 seconds, about 30 seconds to about 50 seconds, about 30 seconds to about 60 seconds, about 30 seconds to about 90 seconds, about 30 seconds to about 120 seconds, about 40 seconds to about 50 seconds, about 40 seconds to about 60 seconds, about 40 seconds to about 90 seconds, about 40 seconds to about 120 seconds, about 50 seconds to about 60 seconds, about 50 seconds to about 90 seconds, about 50 seconds to about 120 seconds, about 60 seconds to about 90 seconds, about 60 seconds to about 120 seconds, or about 90 seconds to about 120 seconds. In some embodiments, the periodicity is adjusted depending on device capabilities (e.g., networking bandwidth, processing power, etc.) and state (e.g., battery life, active state, user preferences, etc.). For example, in some embodiments, a health monitoring sensor data sends data more frequently (e.g., every second). In some embodiments, the device 306 utilizes algorithms for adjusting frequency of polling such as exponential back-off, based on a number of heuristics. For example, in some embodiments, the data sharing and/or polling activity begins once per second and decreases to once per 10 seconds over a period of 10 minutes.

Figure 3B:
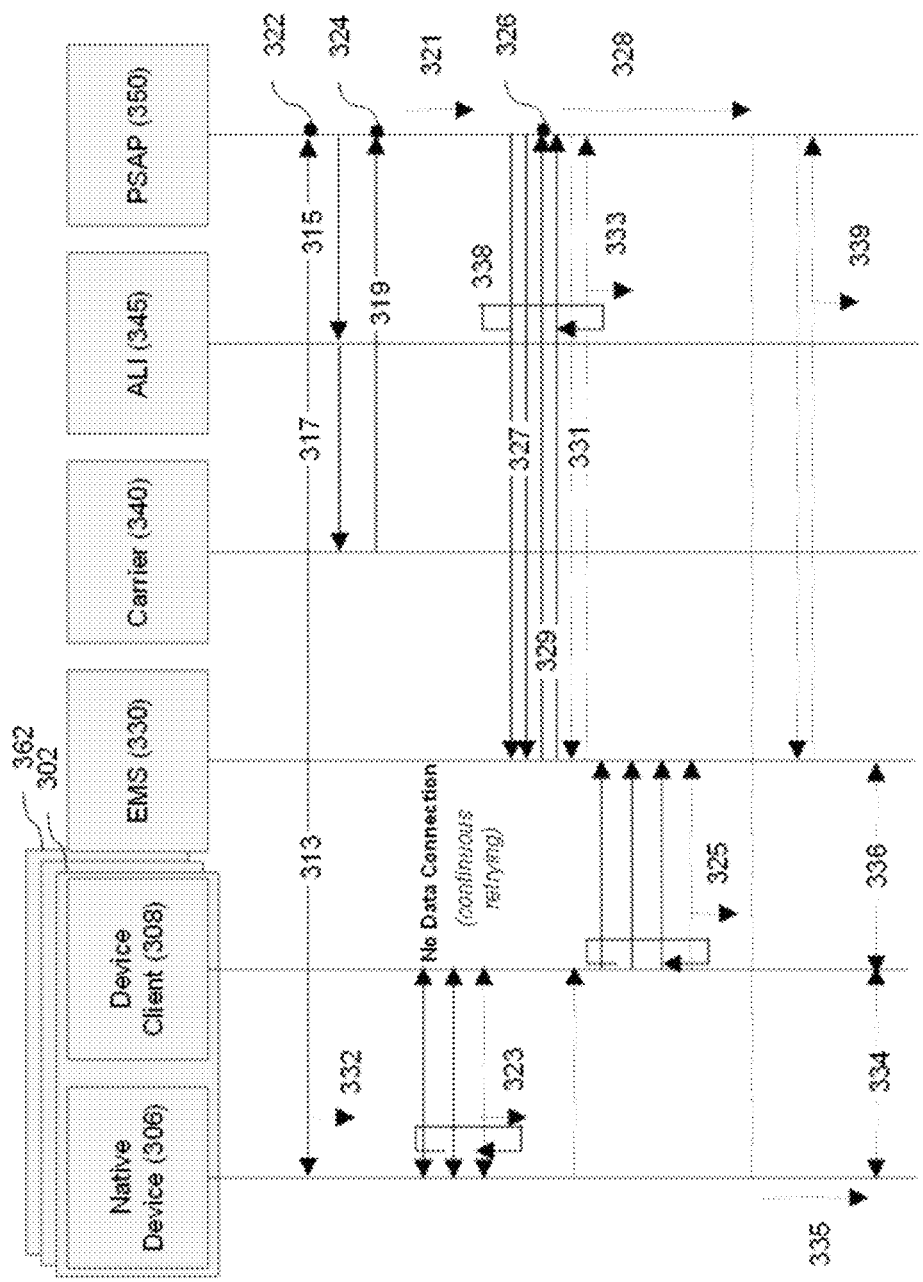

FIG. 3B illustrates an exemplary embodiment of autonomous sharing of digital information associated with an emergency situation when the data connection is intermittent. As shown, an emergency (act 312) occurs and a user initiates an emergency communication (e.g., an emergency call 313, chat session, SMS session, etc.) using a device 306 (e.g., mobile phone) with an emergency services (e.g., PSAP 350). The device 306 initiates the emergency call 313 using native capabilities (act 314). The software is automatically activated (act 316) when the call is detected 332. The network connection is recovered (act 340), which allows transmission of data.

The method is similar to the one shown in FIG. 3A. However, in FIG. 3B, due to the lack of both a data connection and a cellular network for sending an SMS, the device is unable to transmit the data to the EMS 330. In this example, the device 306 periodically attempts to resend the data via all available mechanisms until a new pathway is regained (e.g., a new and stable Wi-Fi connection).

In some embodiments, when the PSAP 350 sends one or more queries for data, the EMS 330 follows rules regarding returning the data to the PSAP in response to the queries. Some exemplary rules include: i) if no recent location data, do not return the location data; ii) return static user data (e.g., name and home address of the person registered to the CBN); and iii) once updated location data is obtained, return the updated location data in subsequent queries. As used herein, static information refers to data that does not change often such as, for example, a person's name, birth date, or home address. In some embodiments, recent data refers to data that has been obtained within the last 10 seconds to 48 hours. In some embodiments, recent data is data obtained within the last about 10 seconds to about 60 seconds. In some embodiments, recent data is data obtained within the last at least about 10 seconds. In some embodiments, recent data is data obtained within the last at most about 60 seconds. In some embodiments, recent data is data obtained within the last about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some embodiments, recent data is data obtained within the last about 10 minutes to about 60 minutes. In some embodiments, recent data is data obtained within the last at least about 10 minutes. In some embodiments, recent data is data obtained within the last at most about 60 minutes. In some embodiments, recent data is data obtained within the last about 10 minutes to about 20 minutes, about 10 minutes to about 30 minutes, about 10 minutes to about 40 minutes, about 10 minutes to about 50 minutes, about 10 minutes to about 60 minutes, about 20 minutes to about 30 minutes, about 20 minutes to about 40 minutes, about 20 minutes to about 50 minutes, about 20 minutes to about 60 minutes, about 30 minutes to about 40 minutes, about 30 minutes to about 50 minutes, about 30 minutes to about 60 minutes, about 40 minutes to about 50 minutes, about 40 minutes to about 60 minutes, or about 50 minutes to about 60 minutes. In some embodiments, recent data is data obtained within the last about 1 hour to about 24 hours. In some embodiments, recent data is data obtained within the last at least about 1 hour. In some embodiments, recent data is data obtained within the last at most about 24 hours. In some embodiments, recent data is data obtained within the last about 1 hour to about 4 hours, about 1 hour to about 8 hours, about 1 hour to about 12 hours, about 1 hour to about 16 hours, about 1 hour to about 20 hours, about 1 hour to about 24 hours, about 4 hours to about 8 hours, about 4 hours to about 12 hours, about 4 hours to about 16 hours, about 4 hours to about 20 hours, about 4 hours to about 24 hours, about 8 hours to about 12 hours, about 8 hours to about 16 hours, about 8 hours to about 20 hours, about 8 hours to about 24 hours, about 12 hours to about 16 hours, about 12 hours to about 20 hours, about 12 hours to about 24 hours, about 16 hours to about 20 hours, about 16 hours to about 24 hours, or about 20 hours to about 24 hours.

Figure 3C:
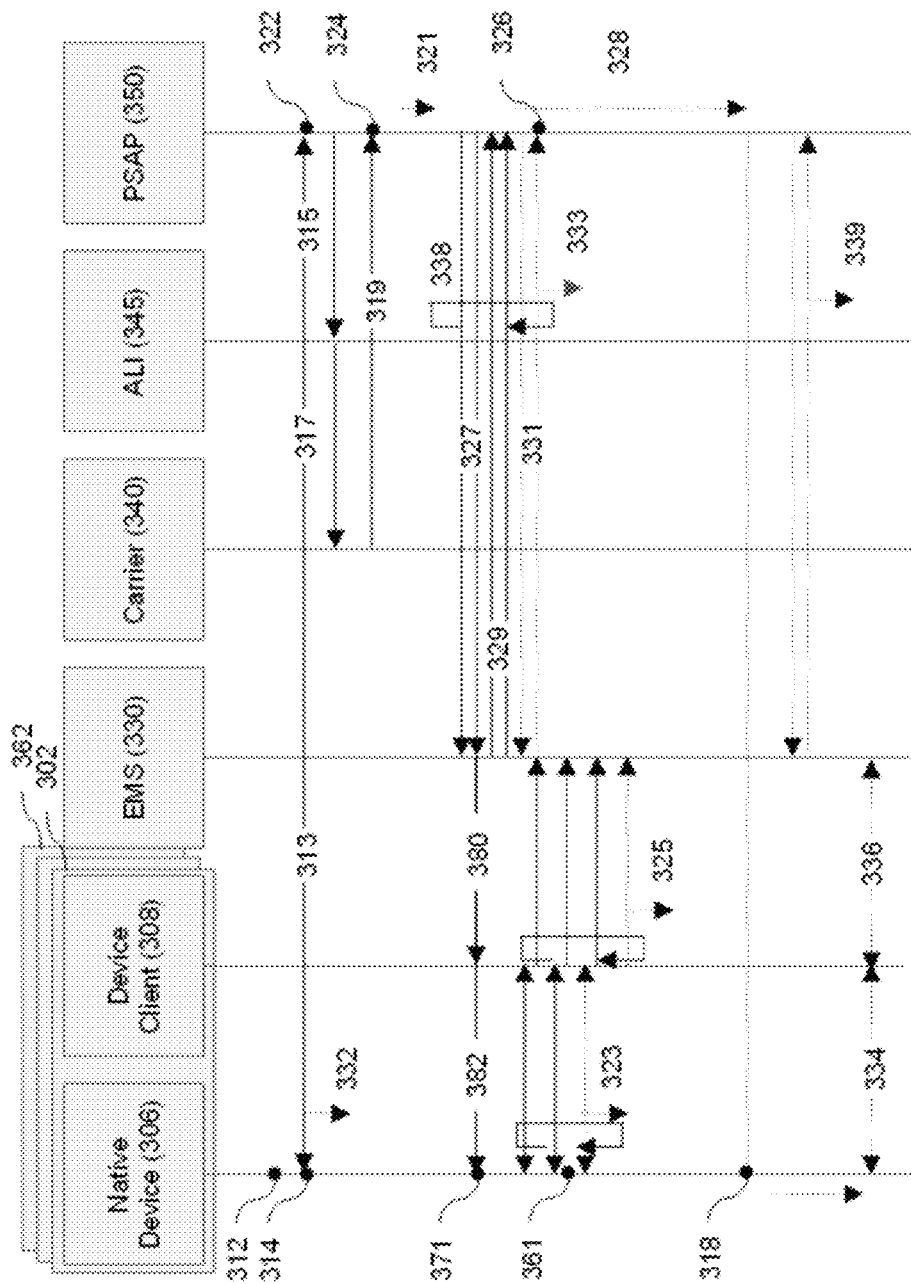

FIG. 3C illustrates how digital information associated with an emergency situation is autonomously obtained when the device has to "wake up" based on a PSAP request. Some devices do not have the capacity to detect an emergency session when the user is initiating an emergency session using that same device (e.g., mobile phone with iOS operating system). In addition, in some embodiments, a device (e.g., mobile phone 207 in FIG. 2) has data regarding the emergency situation even though another device 306 is initiating the emergency session. For example, in a proxy calling situation, the location data of the user in the emergency (e.g., user 205 using device 207) is needed when the user calling for emergency assistance is not at the location of the user in the emergency (user 200 via device 206 in FIG. 2). Thus, provided herein is a method for obtaining information from one or more devices, including devices that do not initiate the emergency session.

As shown, an emergency (act 312) occurs and a user initiates an emergency communication (e.g., an emergency call 313, chat session, SMS session, etc.) using a device 306 (e.g., mobile phone) with an emergency services (e.g., PSAP 350). The device 306 initiates the emergency call 313 using native capabilities (act 314). Here, the device does not detect the emergency until it receives a push notification (act 380) from the EMS 330. In some embodiments, the push notification is Apple Push Notification Service (APNS) or Google Cloud Messaging (GCM) or another platform-native push solution or via a response to a heartbeat as described in FIG. 4. In some embodiments, both these platforms use cryptographically-secure mechanisms to prevent spoofing of identity in sending push notification(s).

In some embodiments, the push notification may be tagged with a token. The device 306 is assigned a token pre-authenticating data requests tagged to the token and the device transmits digital information in response to a data request tagged to the token. In some embodiments, the push is tagged with the device client 208 (e.g., in a header).

In some embodiments, the EMS 330 returns all data that is returned in one data dump. The software application on the PSAP 350, may display the data in various ways. In other embodiments, certain data (e.g., location data) is returned. In some embodiments, the push payload may contain a code for authentication or verification.

In some embodiments, when the device 306 receives the push, it "wakes up," (e.g., exits sleep mode, inactive mode, or some other less active state characterized by diminished functionality, networking, and/or data transmission/reception) and begins synching data (act 342) and transmitting the data to the EMS 330. In some embodiments, the push also "wakes up" the device 306 from one or more sleep or inactive modes, wherein the device moves into one or more active modes.

In some embodiments, the end of the emergency session is not detected for the purpose of determining how long to continue the data transmission. Accordingly, in some embodiments, the device estimates the duration of the emergency session instead of detecting the end of the emergency session for purposes of ensuring continued data transmission for a set period of time. In some embodiments, the device 306 uses a timer to estimate the emergency session. In some embodiments, the timer is set between 1 second to 10 minutes, preferably under 1 minute. In some embodiments, the timer is set to 30 seconds after the latest receipt of information regarding the emergency session. In some embodiments, the timer is about 1 second to about 60 seconds. In some embodiments, the timer is at least about 1 second. In some embodiments, the timer is at most about 60 seconds. In some embodiments, the timer is about 1 second to about 5 seconds, about 1 second to about 10 seconds, about 1 second to about 20 seconds, about 1 second to about 30 seconds, about 1 second to about 40 seconds, about 1 second to about 50 seconds, about 1 second to about 60 seconds, about 5 seconds to about 10 seconds, about 5 seconds to about 20 seconds, about 5 seconds to about 30 seconds, about 5 seconds to about 40 seconds, about 5 seconds to about 50 seconds, about 5 seconds to about 60 seconds, about 10 seconds to about 20 seconds, about 10 seconds to about 30 seconds, about 10 seconds to about 40 seconds, about 10 seconds to about 50 seconds, about 10 seconds to about 60 seconds, about 20 seconds to about 30 seconds, about 20 seconds to about 40 seconds, about 20 seconds to about 50 seconds, about 20 seconds to about 60 seconds, about 30 seconds to about 40 seconds, about 30 seconds to about 50 seconds, about 30 seconds to about 60 seconds, about 40 seconds to about 50 seconds, about 40 seconds to about 60 seconds, or about 50 seconds to about 60 seconds. In some embodiments, the timer is about 1 minute to about 10 minutes. In some embodiments, the timer is at least about 1 minute. In some embodiments, the timer is at most about 10 minutes. In some embodiments, the timer is about 1 minute to about 2 minutes, about 1 minute to about 3 minutes, about 1 minute to about 4 minutes, about 1 minute to about 5 minutes, about 1 minute to about 6 minutes, about 1 minute to about 7 minutes, about 1 minute to about 8 minutes, about 1 minute to about 9 minutes, about 1 minute to about 10 minutes, about 2 minutes to about 3 minutes, about 2 minutes to about 4 minutes, about 2 minutes to about 5 minutes, about 2 minutes to about 6 minutes, about 2 minutes to about 7 minutes, about 2 minutes to about 8 minutes, about 2 minutes to about 9 minutes, about 2 minutes to about 10 minutes, about 3 minutes to about 4 minutes, about 3 minutes to about 5 minutes, about 3 minutes to about 6 minutes, about 3 minutes to about 7 minutes, about 3 minutes to about 8 minutes, about 3 minutes to about 9 minutes, about 3 minutes to about 10 minutes, about 4 minutes to about 5 minutes, about 4 minutes to about 6 minutes, about 4 minutes to about 7 minutes, about 4 minutes to about 8 minutes, about 4 minutes to about 9 minutes, about 4 minutes to about 10 minutes, about 5 minutes to about 6 minutes, about 5 minutes to about 7 minutes, about 5 minutes to about 8 minutes, about 5 minutes to about 9 minutes, about 5 minutes to about 10 minutes, about 6 minutes to about 7 minutes, about 6 minutes to about 8 minutes, about 6 minutes to about 9 minutes, about 6 minutes to about 10 minutes, about 7 minutes to about 8 minutes, about 7 minutes to about 9 minutes, about 7 minutes to about 10 minutes, about 8 minutes to about 9 minutes, about 8 minutes to about 10 minutes, or about 9 minutes to about 10 minutes. As with FIG. 3B, only static information is returned until recent data arrives at the EMS 330 from the device 306.

Figure 4:
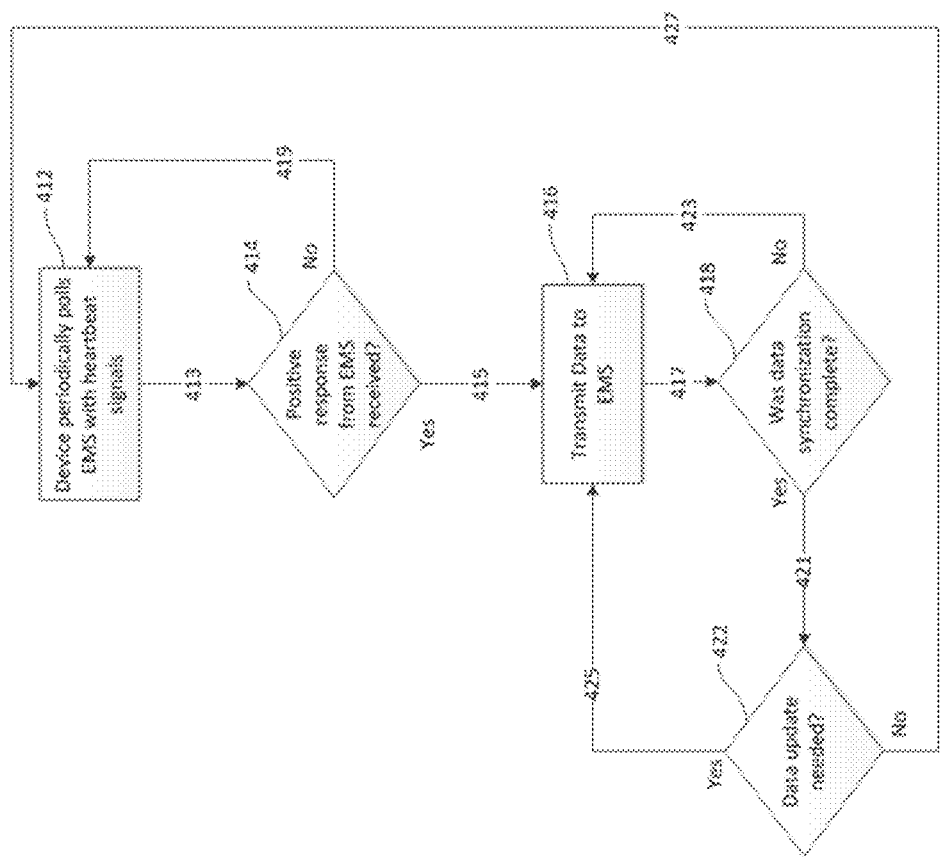
FIG. 4 illustrates an exemplary method for sending heartbeat signals for detecting an emergency communication.

FIG. 4 illustrates an exemplary method for sending "heartbeat" signals (e.g., periodic transmissions) for detecting an emergency communication. In some embodiments, a device detects an emergency communication by sending heartbeat signals to an emergency service. In some embodiments, the device (e.g., mobile phone 206 in FIG. 2) is a digital processing device that initiated the emergency communication when a user (e.g., user 200) called for emergency assistance using the native dialer. In other embodiments, the device (e.g., wearable device 202) is a digital processing device that did not initiate the emergency communication, but has digital information about the emergency situation (e.g., health readings of user 200) after the emergency call was initiated by user 200 via another device (e.g., mobile phone 206).

By using heartbeat signals, a device (e.g., a mobile phone, a wearable device, a computer, a medical communication device, etc.) proactively detects emergency communication regarding and emergency situation and sends relevant digital information for responding to the emergency. In some cases, the emergency communication cannot be immediately detected by the sending device (see discussion regarding FIG. 3C), and the process is instead initiated when the sending device receives a push notification or other message from emergency services. To avoid a delay in getting critical information regarding the emergency situation (including accurate and updated locate on and sensor data), the device polls emergency services to proactively detect the emergency and begin sending the information. In some embodiments, the periodicity of the heartbeat polling and data syncing are adjustable depending on device capabilities (e.g., networking bandwidth, processing power, etc.) and state (e.g., battery life, active state, user preferences, etc.). In this way, a user (e.g., a person who is suffering from a medical condition) is able to anticipate and plan for sending critical data to emergency services in case of an emergency.

As shown, a device periodically polls emergency services (e.g., an EMS, PSAP, etc.) with heartbeat signals (act 412). In some embodiments, the heartbeats are internet-based (e.g., HTTP, HTTPS) requests that include a payload with a device identifier (e.g., device ID, MAC address, SSID, IP address, etc.). In some embodiments, the heartbeat payload includes an identifier for the user such as a phone number, a user name, an email address, a physical address, a license plate number, or other identifying information.

In some embodiments, the periodicity of the heartbeat polling is chosen based on various factors such as device capabilities, device state and nature and user emergency risk factor, user preferences, etc. In some embodiments, the periodicity of the heartbeat polling utilizes algorithms for adjusting frequency of polling such as exponential back-off. For example, in some embodiments, the polling begins by polling once per second and decreases to once per 10 seconds over a period of 10 minutes.

In some embodiments, once a heartbeat signal is received, the emergency service looks up the device identifier to check if an emergency session is active for that device or that user.

In some embodiments, the information about active sessions (e.g., emergency calls) is saved in one or more cache or databases in the EMS. In some embodiments, the EMS queries the active sessions at an EDC (e.g., a PSAP) to check if an emergency session is on-going. The EMS responds with a "No" or negative if an emergency session is not found. Alternatively, the EMS responds with a "Yes" or positive if an emergency session is detected.

In some embodiments, if the EMS does not find an emergency session after looking up device ID (or another identifier), the EMS respond with a "No" to the device (act 414). Thus, there is a "negative response" from the EMS to the device and the device continues periodically polling the EMS with heartbeat signals (act 412).

In some embodiments, if the EMS finds an emergency session after looking up the device ID (or another identifier), the EMS will respond "Yes" to the device (act 414). Thus, there is a "positive response" from the EMS to the device. Next, the device begins data synchronization by obtaining and transmitting digital information (e.g., location data, emergency data, sensor data, etc.) to the EMS (act 416). If data synchronization is not complete (act 418), then the device continues periodic re-transmission of the data until the synchronization is complete (acts 416 & 418).

In some embodiments, if data synchronization is complete (act 418), the device periodically checks if updated data is available regarding the emergency situation (act 422) through the duration of the emergency communication or session (e.g., emergency call). In some embodiments, the periodicity of data synchronization or data updates depends on the device. In some embodiments, exponential back-off algorithms are used to adjust the polling rate, and the initial and end-state periodicity optionally vary depending on the device. As an illustrative example, a wearable device that periodically senses health data is updated more frequently because the data may be changing rapidly. In some embodiments, data is only updated if there is a change (e.g., location data update when the device detects that the location is different from the previously sent data).

In some embodiments, whether a data update is needed depends on is the presence of updated data and confirmation that the emergency communication has not been intentionally ended by the user, the EMS, or the EDC (e.g., PSAP). In some cases, the emergency session has been dropped unintentionally and the device continues to update the EMS. In some embodiments, if updated data is available and the communication session is active (act 422), the device will transmit the updated data to the EMS (acts 416 & 418). In some embodiments, if no updated data is available or the emergency session has ended intentionally (act 422), the device will go back to polling the EMS with heartbeat signals (act 412). In some embodiments, the data from the device is made available to the PSAP that is handling the emergency to facilitate a quick and efficient response.

Additional Embodiments

In accordance with one aspect disclosed herein, there is provided a method for a user communication device to determine, based on information available at the device about the calling logs, active communication sessions, information about a calling/called party, for example, phone numbers, and classification of the on-going call, for example, an SOS call or an E-911 call, and any other form of information available at the device, whether the user of the device is in an on-going or imminent emergency situation. Based on this determination the user communication device may share meta-data with an EMS and/or EDC about the user, for example, meta-data including information about the user's health history, health status, such as sensed data including heart-beat, heart-rate, blood oxygen levels, and pulse-rate, data available about the environment around the user, for example, the air pressure, oxygen content in the air, carbon dioxide levels, levels of other gases of interest, information available about the user communication device, for example, GPS location, history of GPS locations, phone number, sensed information about the user available at the user communication device, type of user communication device, and other relevant information about the emergency situation that the EMS and/or EDC can use to further and more effectively assist the user with an on-going or an imminent request for emergency assistance. The method may comprise construction of a meta-data set from existing data available at the user communication device about the user, the user communication device, and the environment around the user and the user communication device, such that this meta-data set is representative of the most recent and relevant information about the emergency situation, the user, the user communication device, and the environment. The user communication device may include this meta-data set along with updates sent regarding an emergency situation to the EMS and/or EDC serving the location of the user or that is currently serving a request for emergency assistance from the user communication device.

In accordance with another embodiment, the EMS and/or EDC perform a method to autonomously detect whether or not the EMS and/or EDC is in possession of comprehensive meta-data about an existing emergency situation that the EMS and/or EDC are responding to. Responsive to determining that there may be additional meta-data available about the user, the user communication device or the environment around the user and the user communication device that the EMS and/or EDC is not in possession of, the EMS and/or EDC may send a request to the user communication device from which a request for emergency assistance was received to share additional meta-data pertaining to the emergency situation the EMS and/or EDC is currently responding to. Upon receiving the additional meta-data from the user communication device the EMS and/or EDC utilizes the meta-data to determine how to more efficiently or effectively respond to the emergency situation. The method further includes determining, at the EMS and/or EDC, whether there is another data source, for example, a user communication device that belongs to another user, or a database on the Internet that is in possession of meta-data pertaining to the user, the user communication device, or the environment around the user and the user communication device. The EMS and/or EDC may send a request to this other data source for meta-data associated with the emergency situation, the user, the user communication device, or the environment around the user and the user communication device and upon receiving this meta-data utilize the meta-data to determine how to more efficiently or effectively respond to the emergency situation.

In some embodiments, the user communication device contains an application client, implemented in software, to analyze the meta-data about the user, the user communication device and the environment around the user and the user communication device. Based on this analysis, the application client generates a meta-data set. Upon detecting that the user of the user communication device is currently in a call for requesting emergency assistance, or will likely be in a situation requiring emergency assistance, the application client may transmit the meta-data set along with any request for emergency assistance, response to a data request received from an EMS and/or EDC, or with any other communication to the EMS and/or EDC. In some embodiments the application client independently transmits the meta-data to the EMS and/or EDC on the behest of the user without receiving any specific request for sharing of this data.

In some embodiments, the user communication device is a smart device capable of communicating over a data communication channel, for example, a smart phone, a Tablet computer, or laptop computer, that is capable of summarizing and sending meta-data including location information and user health status on an on-demand basis, or as determined by the user communication device, to be shared with a first responder, for example, an EMS and/or EDC, maintaining a data communication link with the EMS and/or the EDC, and updating the EMS and/or EDC with new meta-data information as it becomes available and as determined by the user communication device.

In some embodiments, the user communication device generates a meta-data set upon detecting that the user of the user communication device is currently in a call for requesting emergency assistance from a called party that is not an EDC, for example, a non-public helpline, a corporate helpline, or an emergency contact person, for example, a friend or family member. Responsive to determining that the call for requesting emergency assistance made to the called party is regarding an emergency situation faced by the user, the user communication device may share the meta-data with the called party or a communication device of the called party.

In some embodiments, the EMS and/or EDC is able to "wake up" the user communication device from a non-responsive state of the device, for example, when the user communication device is in a hibernation mode and not providing an active user interface to receive inputs, or when the user communication device is in a sleep mode where the user communication device has many of the critical modules, for example, communication module, user interface, and other such modules, turned "OFF" and has minimum number of modules "ON." Upon receiving a message from the EMS and/or EDC, the user communication device may turn ON certain modules to activate functionality of these modules. The user communication device may then utilize these modules to respond to the EMS and/or EDC with meta-data information requested by the EMS and/or EDC, to facilitate provision of an emergency response to the user of the user communication device.

In some embodiments, the EMS and/or EDC sends a request for meta-data information to user communication devices other than that of the user needing the emergency assistance, however, which are associated with the user communication device of the user needing emergency assistance. These other users' user communication devices may provide additional meta-data information about the user, the user communication device, or the environment around the user needing emergency assistance and the user communication device from which the request for emergency assistance was received.

In some embodiments, the user communication device and the EMS and/or EDC are capable of communicating over a data communication channel, for example, a TCP/IP based communication channel and are able to send and receive data packets containing meta-data or a request for receiving meta-data over this data communication channel in an autonomous fashion, when the user communication device decides that the sharing of the information with another user communication device, EMS, or a communication device at an EDC is desirable. Such a data exchange may be pre-approved by the user of the user communication device. The user may pre-approve autonomous sharing of either specific types of meta-data, or meta-data in general and may pre-approve the types of entities with which data may be autonomously shared by the user communication device.

In some embodiments, disclosed herein are methods for a user communication device of a user to share meta-data available on the user communication device based on certain events, the method comprising: determining, by the user communication device, on an autonomous basis, that the user is employing the device for placing an on-going call for emergency assistance, or will likely place a call for emergency assistance within a certain period of time; responsive to making the determination, constructing a meta-data set from data available at the device about the user, the user communication device, and the environment around the user and the device, the meta-data set being representative of the most recent and relevant information about an emergency situation the user is facing and/or an imminent emergency situation the user will face or is likely to face, and being representative of information about the user, the user communication device and the environment; responsive to determining, at the user communication device, that the user of the user communication device is in an on-going call for emergency assistance, will imminently be placing a call for emergency assistance, and/or is expected to place a call for emergency assistance to a called party, transmitting the meta-data set to the called party; confirming, reception of the meta-data set and information contained in the meta-data set with the called party; responsive to detecting an updated information about the user, the user communication device, and the environment around the user, constructing, by the user communication device, an updated meta-data set representative of the updated information; transmitting the updated meta-data set to the called party; confirming reception of the updated meta-data set and information contained in the updated meta-data set with the called party; and actively managing communications between the user communication device and any communication devices of the called party. In some embodiments, the called party is an EDC and/or EMS. In some embodiments, the method further comprises: responsive to determining, at the user communication device, based on a current status of the user derived from the meta-data available about the user, the user communication device, and the environment, that the user of the user communication device is in a call requesting emergency assistance for a current emergency situation that the user is affected by, determining a potential threat to the user of the emergency situation, a type of the threat, and a possible impact of the threat to the user; responsive to determining that the call requesting emergency assistance is not with an EMS and/or EDC, making a determination if the type of the threat and the possible impact of the threat to the user is such that an EMS and/or EDC should be contacted; responsive to determining that the EMS and/or EDC should be contacted, providing an alert to the user at an interface of the user communication device; receiving a response to the alert from the user; determining, in view of the response received from the user, the type of threat, and the possible impact of the threat to the user, whether to construct and transmit a request for emergency assistance including a meta-data set representative of the most recent and relevant information about the emergency situation to the EMS and/or EDC that is serving the location of the user as determined by a location determination module in the user communication device; and responsive to constructing and transmitting the request for emergency assistance to EMS and/or EDC, receiving confirmation from the EMS and/or EDC of reception of the meta-data set and the information contained in the meta-data set, managing communication with the EMS and/or EDC, and informing the user about the communication with the EMS and/or EDC and the transmission of the request for emergency assistance. In some embodiments, the determination, by the user communication device that the user is employing the device for placing an on-going call for emergency assistance, or will likely place a call for emergency assistance within a certain period of time, is based on data available about calling logs, active communication sessions, information about the called party, classification of the on-going call, and any other form of information available at the device. In further embodiments, the information about the called party includes a phone number. In further embodiments, the on-going call is classified as an SOS and/or E-911 call. In some embodiments, the meta-data set constructed and shared by the user communication device with the called party includes meta-data about the user and the user communication device, the meta data including location information about the user and the user communication device, health data about the user, and information about the environment. In further embodiments, the location information about the user and the user communication device includes one or more of GPS position information, history of GPS locations, cellular base station triangulation information from the most recent base station the device is associated with, Wi-Fi positioning information, and other form of location information. In further embodiments, the meta-data further includes a representation of one of a phone number of the user communication device and a type of the user communication device. In further embodiments, the health data includes one or more of health status of the user, user health history, and heart-beat, heart-rate, blood oxygen levels, and pulse-rate sensed about the user by sensors at the user communication device and available at the user communication device. In further embodiments, the information about the environment includes one or more of air pressure, oxygen content in the air, carbon dioxide levels, and levels of other gases of interest. In some embodiments, the user communication device transmits the meta-data set to an EMS and/or EDC responsive to a request from the EMS and/or EDC sent after receiving a request for emergency assistance from the user communication device. In further embodiments, the EMS and/or EDC, sends the request responsive to one of not receiving or not being in prior possession of the most recent meta-data regarding the emergency situation, including most recent meta-data about the user, the device, and the environment. In some embodiments, the user communication device hosts an application client and communicates with an EMS and/or EDC serving the request for emergency assistance and/or serving the area in which the user is located via the application client, the application client constructing and sharing the meta-data set about the user, user communication device, and the environment and managing data connections and updates of meta-data information between the user communication device and the EMS, and/or EDC.

In some embodiments, disclosed herein are user communications devices configured to determine if a user of the device is currently engaged in, or is imminently going to be engaged in a call for emergency assistance, and to construct and share a meta-data set, the user communications device comprising: a user interface; and physical interaction components; and a communications module configured to send and receive a message including a meta-data set over a communications network, the meta-data containing information about the user, user communication device, and the environment around the user and the user communication device; and a processor configured to: determine, based on data from the communications module, that the processor and associated modules on the user communications device are being employed for placing an on-going call, and/or based on data from the communication module of the user communications device and associated modules, that the processor and associated modules on the device will be employed within a certain period of time for placing a call for emergency assistance; responsive to detecting that the processor and associated modules are being employed and/or are going to be employed within a certain period of time for placing a call for emergency assistance, assimilate meta-data about the user and the environment from modules on the user communication device, construct a meta-data set, and share the meta-data set with an EMS and/or EDC serving a location of the user and/or responding to the request for emergency assistance; responsive to receiving, via the communications module, a request from an EMS and/or EDC to share meta-data regarding an on-going call for emergency assistance received from the user communication device, assimilate meta-data about the user and the environment, construct a meta-data set, and share the meta-data set with the EMS and/or EDC serving the location of the user and/or responding to the request for emergency assistance; establish a data communications link, via the communications module, to an EMS and/or EDC and respond to requests received from the EMS and/or EDC pertaining to an emergency situation that the user is currently being affected by and/or is likely to be impacted by within a certain period of time; receive a real-time data from sensors and a locationing module on the device, regarding the latest sensed health status and location of the user; and update the meta-data set shared with the EMS and/or EDC to include an indication of the latest sensed health status and location of the user. In some embodiments, the device is a mobile phone. In some embodiments, the communications module is further configured to send and receive a message including a summary of the meta-data set representing key elements of data relevant to the emergency situation. In some embodiments, the processor assimilated meta-data about the user and the environment from one or more of the communication module, sensors, a user interface module, a location determination module, and other modules capable of collecting or storing data on the user communication device. In some embodiments, the user communication device is a mobile user communication device including one of a Tablet computer, a Smart phone, laptop computer, a wearable device, or any other form of end-device used by a user. In some embodiments, the user communication device hosts an application client and the processor interacts with the user of the device using the application client, the application client used to input meta-data from the user into the device and to translate commands and emergency alerts from the processor into user recognizable actions. In further embodiments, the user recognizable actions are displays on a user interface of the user communication device. In further embodiments, the commands from the processor include one or more of voice commands, video data, a text based message, or any other form of user-machine interaction that is understandable by a user. In further embodiments, the application client translates user input, including user responses to an emergency alert presented by the processor to the user on a user interface of the device into machine code or commands the processor of the device can understand and sends the machine code or commands to the processor.

In some embodiments, disclosed herein are emergency management systems (EMS) containing first computing system and a first communications system, the EMS comprising: at least one first input/output (I/O) system configured to receive a meta-data set from a user communication device over data communication channels in response to a request sent by the EMS over the at least one first I/O system and to receive requests for emergency assistance from the user communication device; a communications module configured to send and receive messages, including receiving requests for emergency assistance and sending requests for receiving meta-data information pertaining to an emergency situation over data communication networks or analog voice channels, and to communicate these messages to the processor in the device; and at least one first processing unit in communication with the at least one first I/O system and configured to: receive a request for emergency assistance from a user communication device at a communication module of first computing system and at the at least one first I/O system and interpret the received request to be a request for emergency assistance; and determine if meta-data information pertaining to the request for emergency assistance is received along with the request for emergency assistance, and based on successful verification that the meta-data information is not received with the request for emergency assistance, construct a request for sharing of the meta-data information from the user communication device with the EMS at the communication module and at the at least one first I/O system, and to provide confirmation of the reception of the meta-data information with the user communication device responsive to successful reception of the meta-data information by the EMS; responsive to a determination that the user communication device is not able or available to send the meta-data pertaining to the emergency situation, send a request for sharing meta-data to another one or more user communication devices that are associated with the user communication device, and receive the meta-data information from the one or more user communication devices at the at least one first I/O system; periodically analyze the meta-data set and update the meta-data set upon receiving new information about the emergency situation, and send an updated request for reception of meta-data upon determining that there may be new information that is not in the possession of the EMS regarding the emergency situation; and actively manage data communication links between the user communication device and the EMS and with an emergency dispatch center.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-In

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

EXAMPLES

The following illustrative examples are representative of embodiments of the methods, devices, systems, and media described herein and are not meant to be limiting in any way.

Example 1

Harry is 70 years old and has a heart condition that requires him to take medication daily to manage his blood pressure. Because his heart condition puts him at risk of fainting spells, Harry wears a smartwatch that has a sensor for monitoring his pulse and blood pressure and associates the smartwatch with his cell phone via a Bluetooth connection. The smartwatch has an emergency button that he can press in case he is suffering a medical emergency. Several months pass without incident. Then, Harry forgets to take his medicine one day while watching TV on his couch. Harry's blood pressure drops dangerously low, and Harry becomes lightheaded and dizzy. Harry presses the emergency button on his smartwatch to initiate an emergency call with a local public safety access/answering point (PSAP) through his cell phone. The smartwatch detects the emergency call and autonomously obtains location information from its GPS and heart rate and blood pressure data from its sensor. The smartwatch then establishes a data connection with an emergency management system (EMS) and sends the (encrypted) location information and sensor data to the emergency management system. The smartwatch continues to periodically send updated location information and sensor data throughout the duration of the call. The emergency management system associates the received information and data with the call-back number (Harry's phone number) and stores all of it in a mobile device location database. Meanwhile, the PSAP regularly queries the EMS for updated location and sensor data using Harry's phone number. Although Harry is unable to move, his pulse has been steadily getting weaker. The PSAP dispatcher relays this information to the first responder emergency medical technicians rushing towards Harry's location in an ambulance. The first responders double check their equipment to make sure they bring the appropriate medical supplies for dealing with a patient suffering from a depressed heart rate and blood pressure. Fortunately, they arrive on time thanks to the accurate and current location information provided by Harry's smartwatch, stored by the EMS, accessed by the PSAP, and relayed to the first responders. The first responders are then able to provide appropriate medical attention since they arrive on the scene fully prepared based on having knowledge of up-to-date sensor data on Harry's heart rate and blood pressure. Harry is stabilized and rushed to the hospital. Thanks to the rapid emergency response, Harry makes a quick recovery and is soon back to his old self.

Example 2

John is a former Eagle Scout and always likes to be prepared. To make sure he is able to handle any emergency he encounters, John decides to install an emergency data sharing application on his cell phone. He also links his phone to his smart watch, the onboard vehicle computer in his car, his home security system, and his work computer so that they are connected and able to communicate with each other Bluetooth, Wi-Fi, satellite, and/or the Internet. One day, John is on his way to work on the freeway when a car crash unfolds right in front of him. Being a Good Samaritan, John immediately pulls over onto the shoulder and calls 911 using the native dialer on his cell phone. His emergency call is routed to a public safety access point (PSAP) by his phone's cellular carrier through the nearest cell tower, which is about a mile away. Meanwhile, when John dials 911, the emergency data sharing application on his cell phone detects the emergency call. His phone uses its onboard GPS and Wi-Fi triangulation to obtain an accurate location for itself to within 10 meters. The phone continues to sync and store its location periodically. However, John is in a location with poor reception for establishing a data connection. The bad data connection prevents John's phone from sending its encrypted location to an emergency management system (EMS). During this time, John is connected to the PSAP through his 911 call. The PSAP attempts to obtain John's location. Although the cell tower through which John's call is routed provides some location information (location of the cell tower itself), it is inaccurate and fails to provide a precise location for John's cell phone. The PSAP queries the EMS with the callback number (John's phone number). The EMS searches its database for the callback number but does not find a recent or current saved location (within 24 hours). The EMS then sends a push notification to John's phone and to other associated user devices (the smartwatch, the vehicle console, the home security system, and the work computer). Due to the bad data connection, the phone and smartwatch do not receive the pushes. However, the vehicle console has a good cellular signal in the area and receives the push. The vehicle console has a GPS from which it obtains accurate location data (x-y coordinates). Before the location data is received, the EMS does not send location data in its responses to the PSAP queries because no recent location is saved. Once the location data is received from the vehicle console, however, the EMS saves the location data in its database. Then, in the next periodic response to the query, the "current" location data is sent to the PSAP via encrypted pathways. Upon obtaining an accurate location, the PSAP directs first responders to the scene of the crash. The location received at the PSAP is displayed appropriately based on the metadata attached to that location. In this case, the PSAP is shown that the location is of the vehicle associated with the user, and not the calling device itself. Because the location sharing process is autonomous, the sequence of events that begins with the phone call and ends with the PSAP receiving John's current and accurate location takes less than 30 seconds.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A method of providing digital information informative of an emergency situation to an emergency service provider by an emergency management system, the method comprising:

a) autonomously detecting initiation of an emergency communication session between a mobile wireless device and the emergency service provider;

b) autonomously obtaining the digital information of the mobile wireless device through an alternate data channel after initiation of the emergency communication session and before receiving a data query regarding the emergency situation, the digital information comprising a location of the mobile wireless device, wherein the location is determined on the mobile wireless device;

c) associating the digital information informative of the emergency situation with the mobile wireless device using a device identifier;

d) receiving the data query regarding the emergency situation, the data query comprising the device identifier from the emergency service provider;

e) identifying return data comprising the digital information associated with the device identifier in one or more databases;

f) applying at least one rule to the return data before transmitting the return data to the emergency service provider, wherein the least one rule comprises configuring the return data to (i) exclude dynamic data that is not recent data, (ii) include the dynamic data once it has been updated, and (iii) include static data; and g) transmitting the return data comprising the digital information associated with the device identifier to the emergency service provider through a secure channel in response to the data query.

2. The method of claim 1, wherein the initiation of the emergency communication session comprises a user pressing a soft button, hard button, or panic button, or providing a voice command on the mobile wireless device.

3. The method of claim 1, wherein obtaining the digital information comprises sending a push notification or an SMS to the mobile wireless device.

4. The method of claim 1, wherein obtaining the digital information comprises receiving the digital information autonomously transmitted from the mobile wireless device.

5. The method of claim 1, wherein the location of the mobile wireless device comprises x, y, and z coordinates.

6. The method of claim 1, wherein the return data comprises a device number, a latitude, a longitude, and a location accuracy.

7. The method of claim 1, wherein the device identifier is a callback number (CBN).

8. The method of claim 1, wherein the emergency communication session is an emergency call initiated through a native dialer of the mobile wireless device.

9. The method of claim 1, wherein the digital information is transmitted via encrypted HTTPS, a data SMS or both.

10. The method of claim 1, wherein the mobile wireless device is assigned a token pre-authenticating data requests tagged to the token, wherein the mobile wireless device transmits the digital information in response to a data request tagged to the token sent by the emergency management system.

11. The method of claim 1, wherein the dynamic data comprises the location of the mobile wireless device.

12. The method of claim 1, wherein the dynamic data comprises sensor data comprising one or more environmental parameters or health parameters.

13. The method of claim 12, wherein the sensor data is obtained from at least one of a sensor on the mobile wireless device, a sensor in proximity to the mobile wireless device, a sensor associated with an electronic device in proximity to the mobile wireless device, a sensor in a network with the mobile wireless device, and a sensor associated with a mobile wireless device in a network with the mobile wireless device.

14. The method of claim 1, wherein the static data comprises user identity, user name, height, weight, eye color, hair color, ethnicity, national origin, religion, language(s) spoken, vision, home address, work address, occupation, family information, user contact information, emergency contact information, social security number, alien registration number, driver's license number, vehicle VIN, organ donor, or any combination thereof.

15. An emergency management system comprising at least one processor, a memory, a network component, and a computer program including instructions executable by the at least one processor to create a server software application for managing emergency communication sessions, the server software application comprising:
   a) a software module autonomously detecting initiation of an emergency communication session between a mobile wireless device and an emergency service provider;
   b) a software module autonomously obtaining digital information of the mobile wireless device through an alternate data channel after initiation of the emergency communication session and before receiving a data query regarding an emergency situation, the digital information comprising a location of the mobile wireless device, wherein the location is determined on the mobile wireless device;
   c) a software module associating the digital information informative of the emergency situation with the mobile wireless device using a device identifier;
   d) a software module receiving the data query regarding the emergency situation, the data query comprising the device identifier from the emergency service provider;
   e) a software module identifying return data comprising the digital information associated with the device identifier in one or more databases;
   f) a software module applying at least one rule to the return data before transmitting the return data to the emergency service provider, wherein the least one rule comprises configuring the return data to (i) exclude dynamic data that is not recent data, (ii) include the dynamic data once it has been updated, and (iii) include static data; and
   g) a software module transmitting the return data comprising the digital information associated with the device identifier to the emergency service provider through a secure channel in response to the data query.

16. The system of claim 15, wherein the return data comprises a device number, a latitude, a longitude, and a location accuracy.

17. The system of claim 15, wherein the device identifier is a callback number (CBN).

18. The system of claim 15, wherein the emergency communication session is an emergency call initiated through a native dialer of the mobile wireless device.

19. Non-transitory computer-readable storage media encoded with a computer program including instructions executable by a processor to create a server software application for managing emergency communication sessions, the server software application comprising:
   a) a software module autonomously detecting initiation of an emergency communication session between a mobile wireless device and an emergency service provider;
   b) a software module autonomously obtaining digital information of the mobile wireless device through an alternate data channel after initiation of the emergency communication session and before receiving a data query regarding an emergency situation, the digital information comprising a location of the mobile wireless device, wherein the location is determined on the mobile wireless device;
   c) a software module associating the digital information informative of the emergency situation with the mobile wireless device using a device identifier;
   d) a software module receiving the data query regarding the emergency situation, the data query comprising the device identifier from the emergency service provider;
   e) a software module identifying return data comprising the digital information associated with the device identifier in one or more databases;
   f) a software module applying at least one rule to the return data before transmitting the return data to the emergency service provider, wherein the least one rule comprises configuring the return data to (i) exclude dynamic data that is not recent data, (ii) include the dynamic data once it has been updated, and (iii) include static data; and
   g) a software module transmitting the return data comprising the digital information associated with the device identifier to the emergency service provider through a secure channel in response to the data query.

20. The media of claim 19, wherein the return data comprises a device number, a latitude, a longitude, and a location accuracy.

* * * * *